Feb. 7, 1961  A. G. BODINE, JR  2,970,660
POLYPHASE SONIC EARTH BORE DRILL
Filed July 12, 1954  15 Sheets-Sheet 1
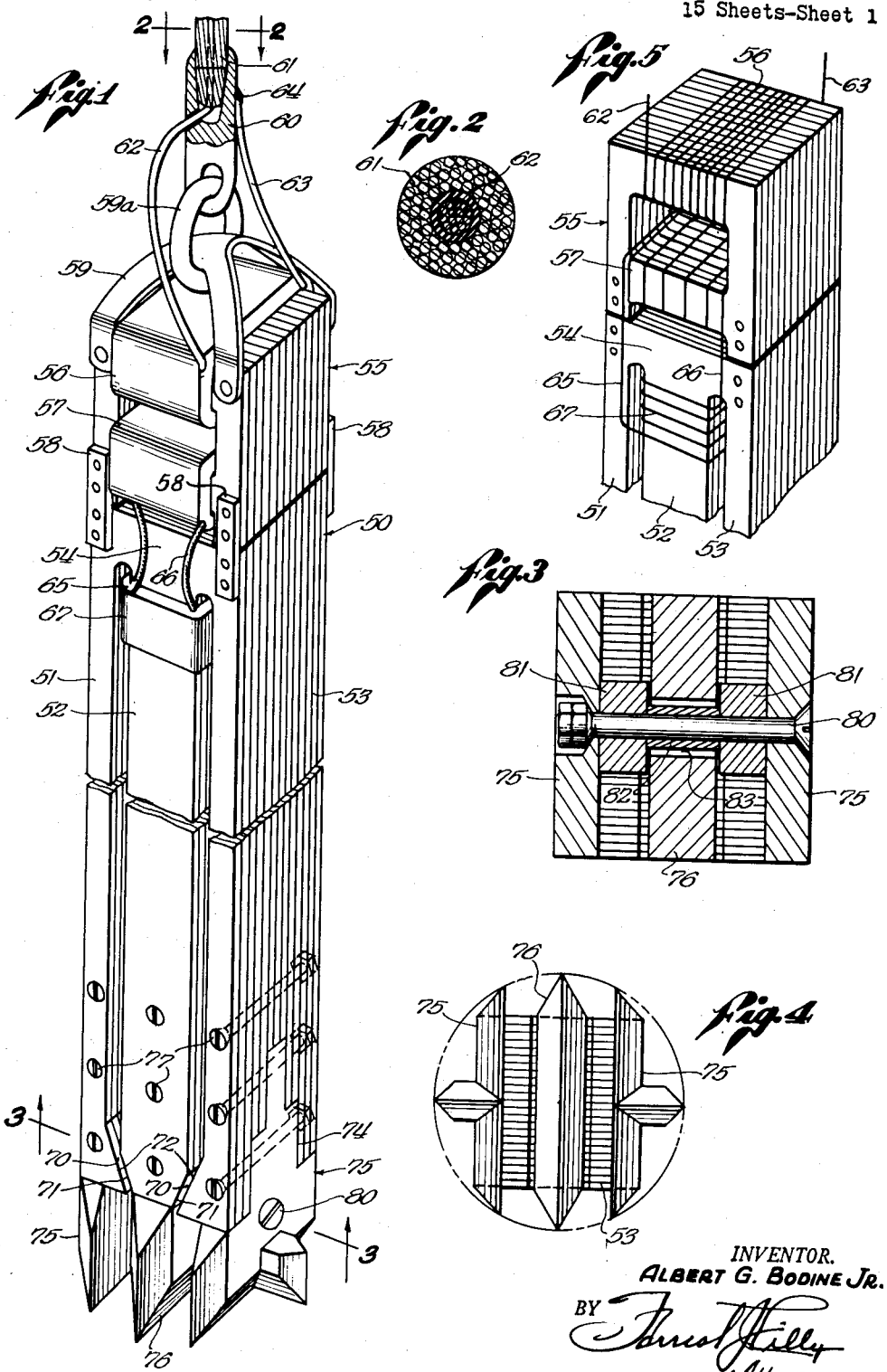
INVENTOR.
ALBERT G. BODINE JR.
BY
Attorney Feb. 7, 1961 A. G. BODINE, JR 2,970,660
POLYPHASE SONIC EARTH BORE DRILL
Filed July 12, 1954 15 Sheets-Sheet 2

INVENTOR.
ALBERT G. BODINE JR.
BY
Attorney

Feb. 7, 1961 A. G. BODINE, JR 2,970,660
POLYPHASE SONIC EARTH BORE DRILL
Filed July 12, 1954 15 Sheets-Sheet 3
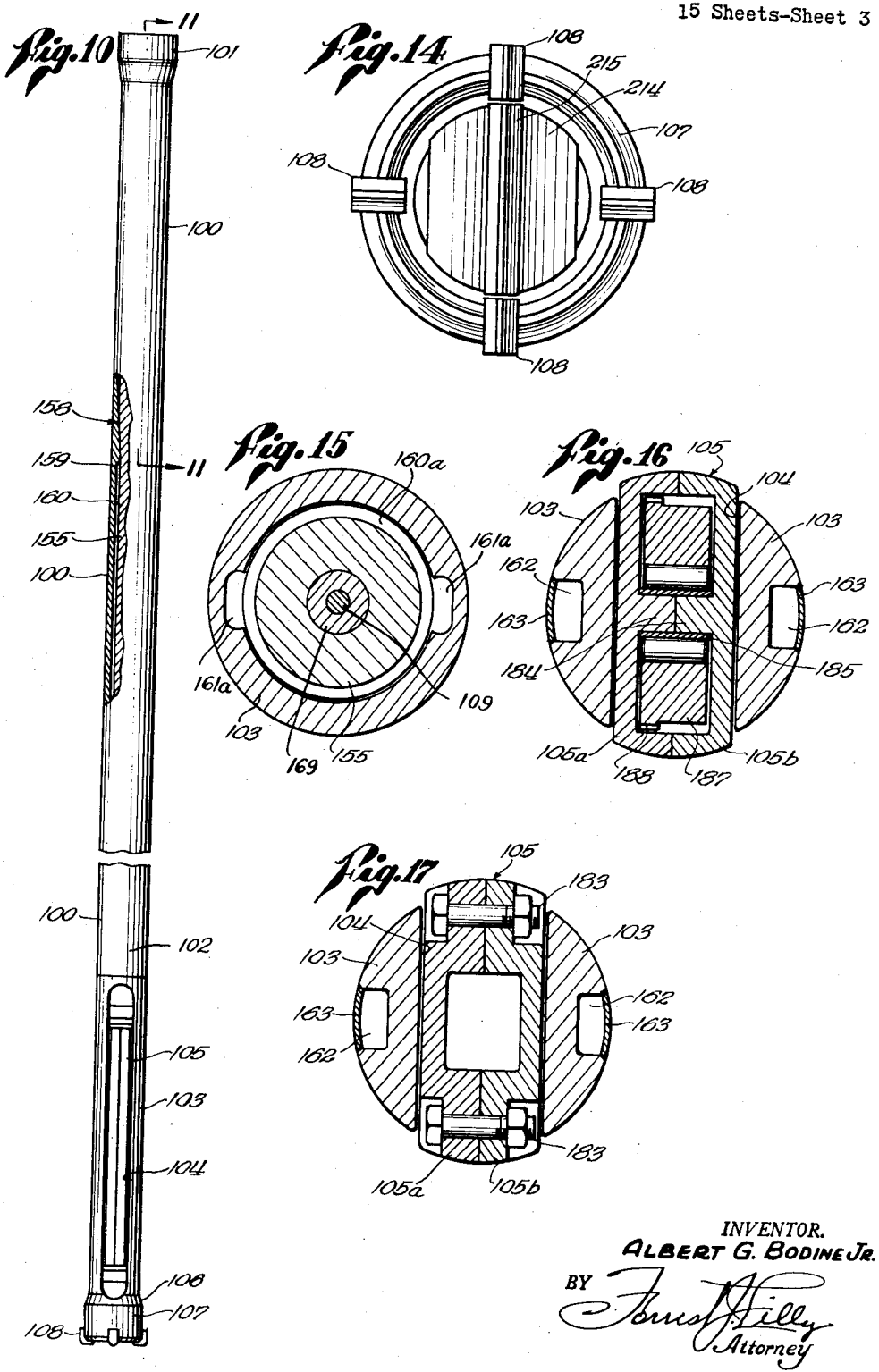
INVENTOR.
ALBERT G. BODINE JR.
BY
Attorney

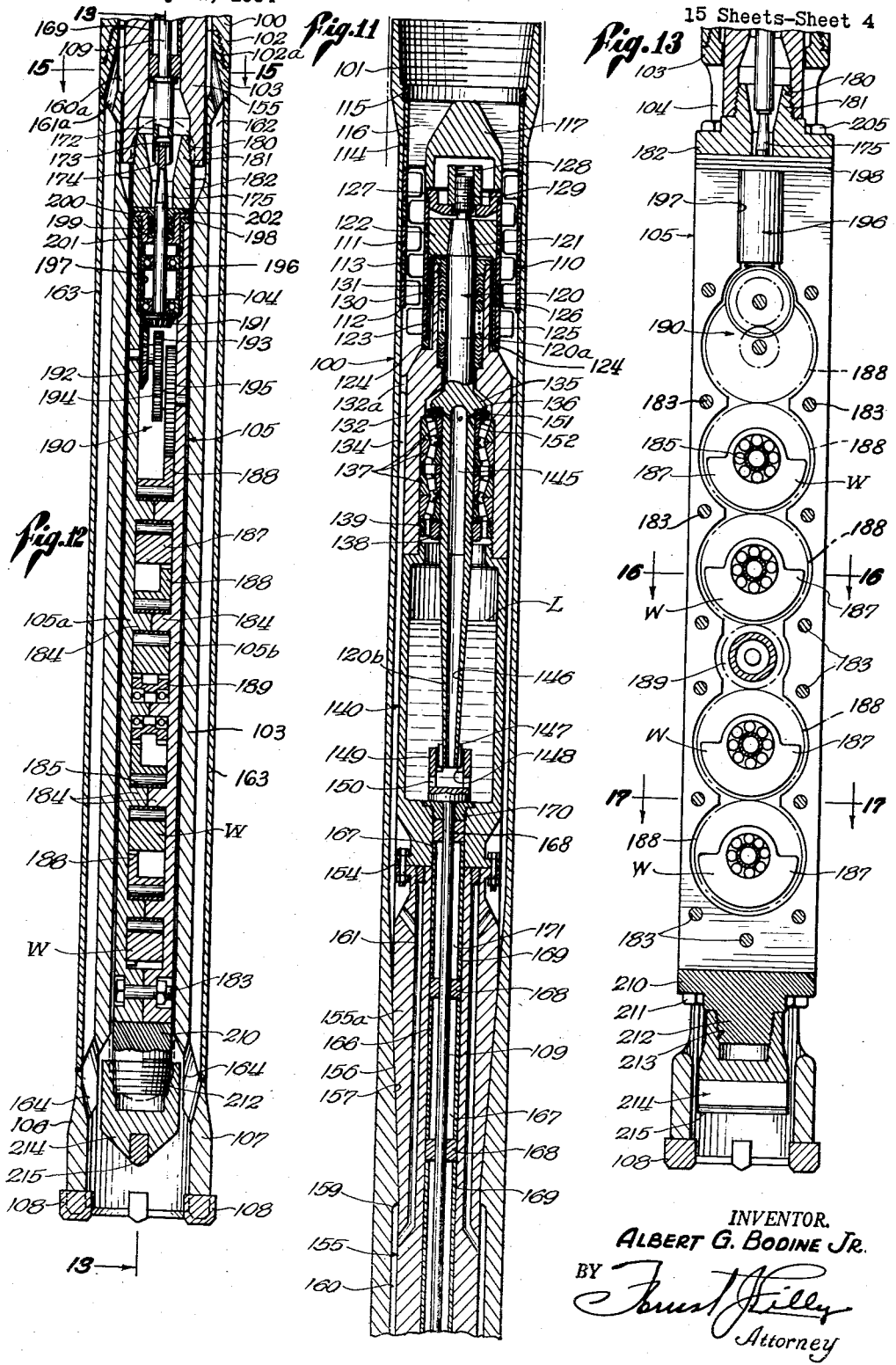

Feb. 7, 1961
A. G. BODINE, JR
2,970,660
POLYPHASE SONIC EARTH BORE DRILL
Filed July 12, 1954
15 Sheets-Sheet 5
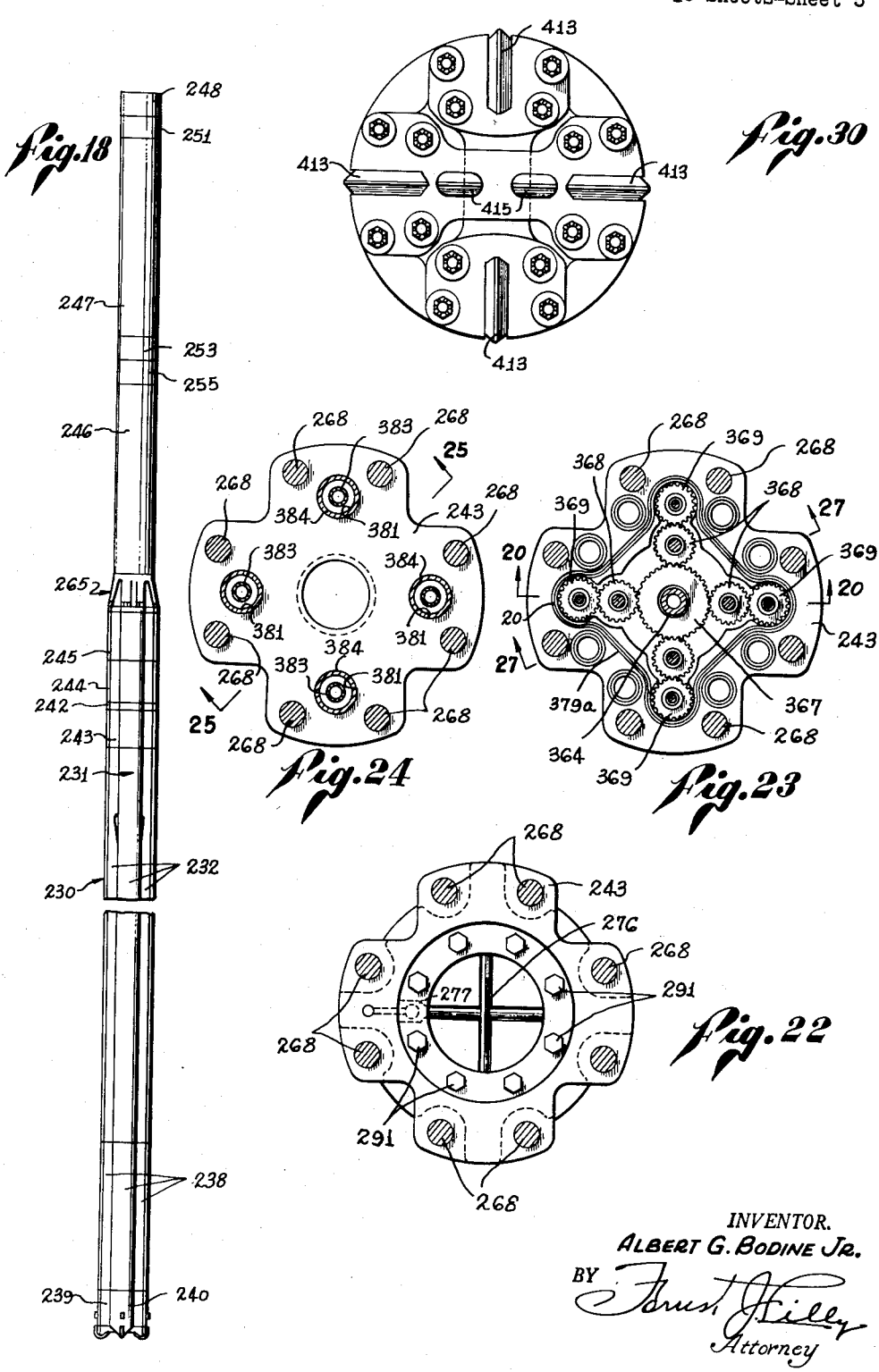
INVENTOR.
ALBERT G. BODINE JR.
BY
Attorney Feb. 7, 1961 A. G. BODINE, JR 2,970,660
POLYPHASE SONIC EARTH BORE DRILL
Filed July 12, 1954 15 Sheets-Sheet 6

INVENTOR.
ALBERT G. BODINE JR.
BY
Attorney

Feb. 7, 1961  A. G. BODINE, JR  2,970,660
POLYPHASE SONIC EARTH BORE DRILL
Filed July 12, 1954  15 Sheets-Sheet 7

INVENTOR.
ALBERT G. BODINE JR.
BY
Attorney

Feb. 7, 1961 A. G. BODINE, JR 2,970,660
POLYPHASE SONIC EARTH BORE DRILL
Filed July 12, 1954 15 Sheets-Sheet 8
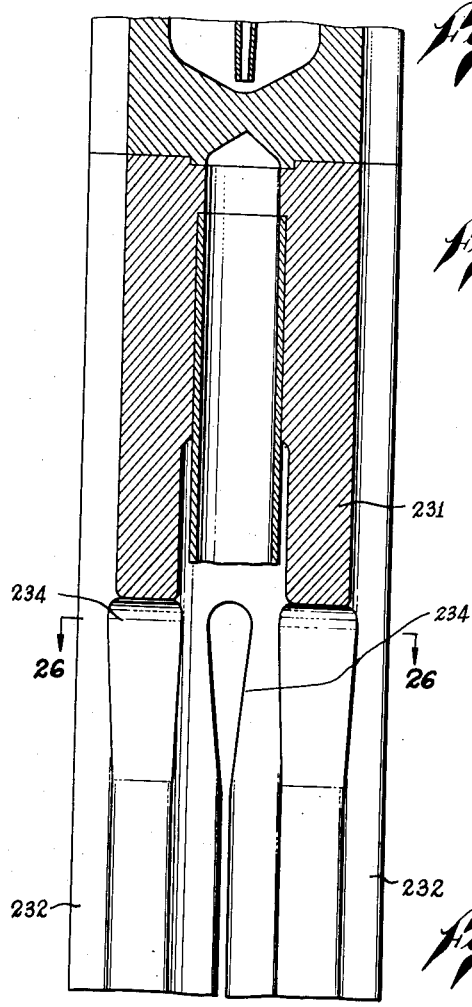
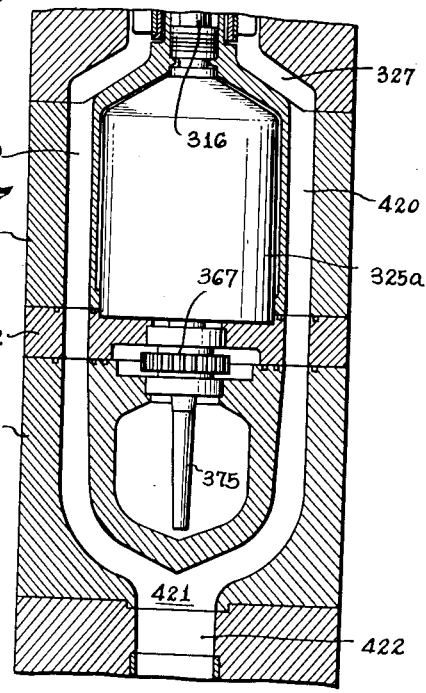
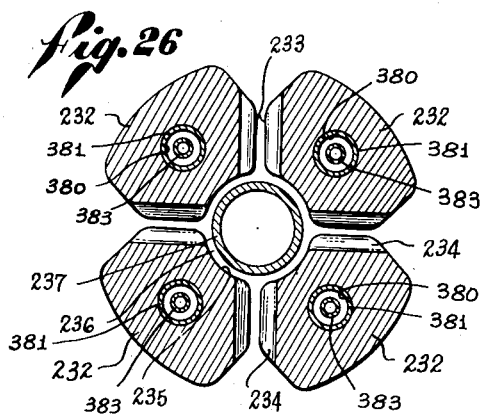
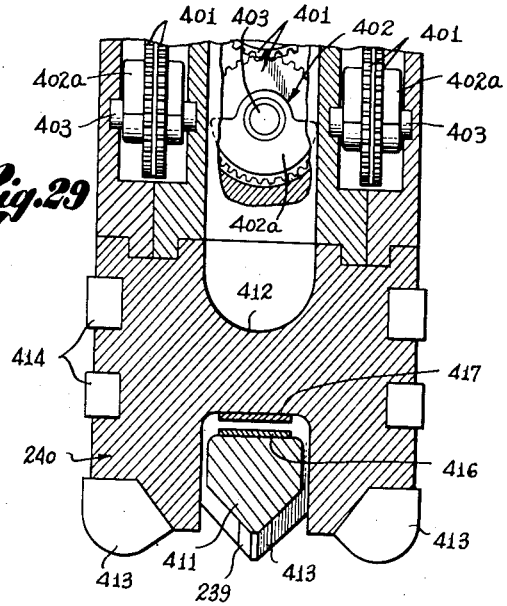
INVENTOR.
ALBERT G. BODINE JR.

Feb. 7, 1961  A. G. BODINE, JR  2,970,660
POLYPHASE SONIC EARTH BORE DRILL
Filed July 12, 1954  15 Sheets-Sheet 9
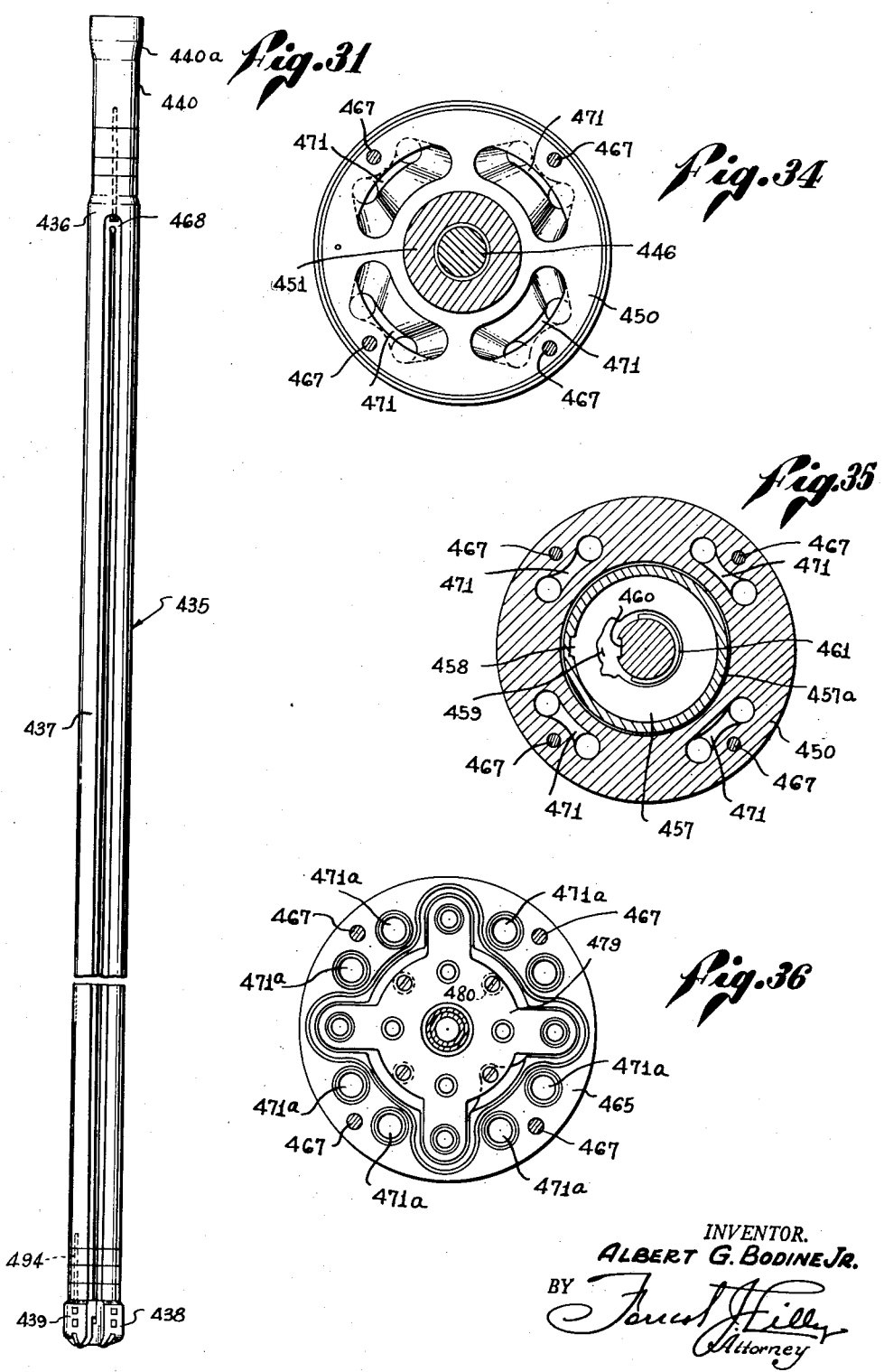
INVENTOR.
ALBERT G. BODINE JR.
BY
Attorney

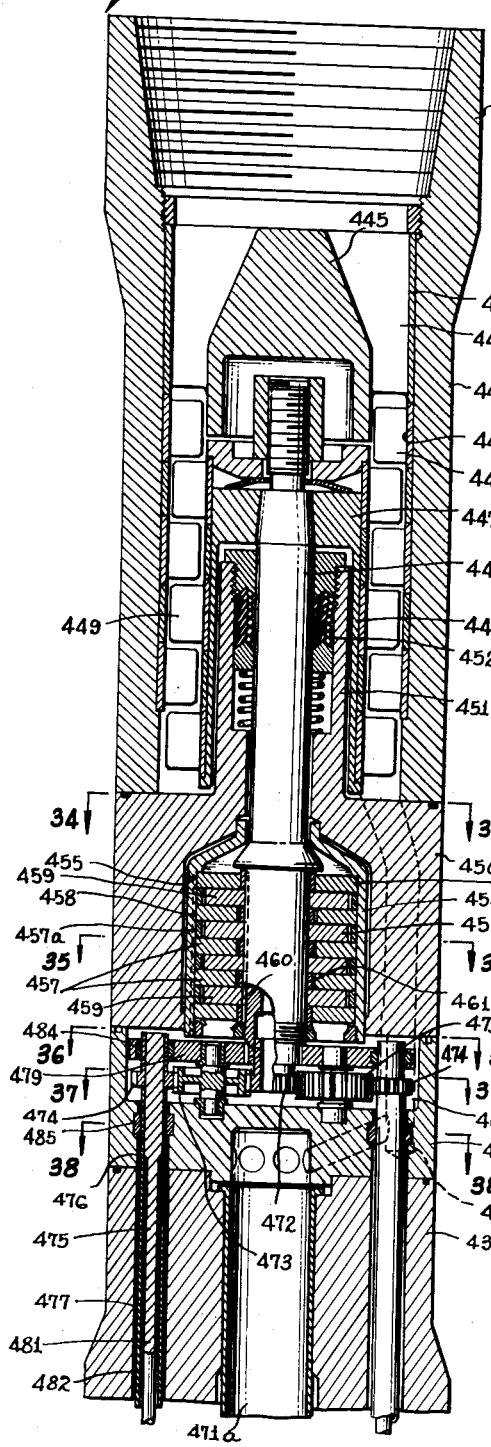
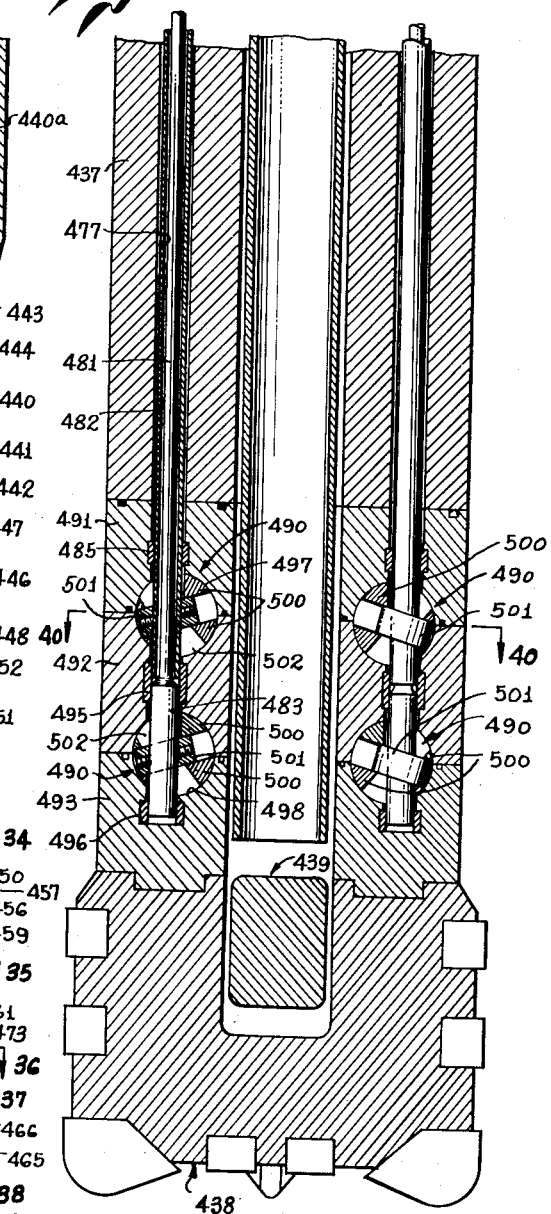

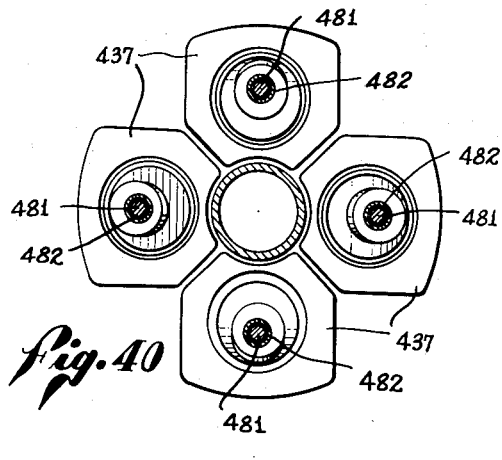
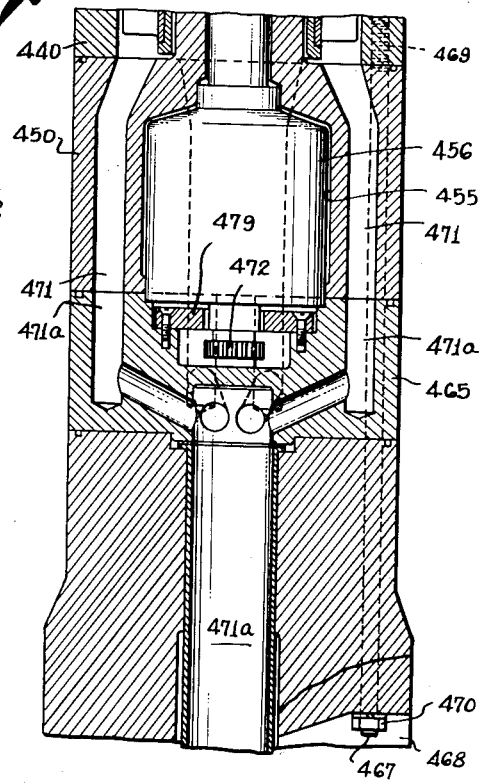
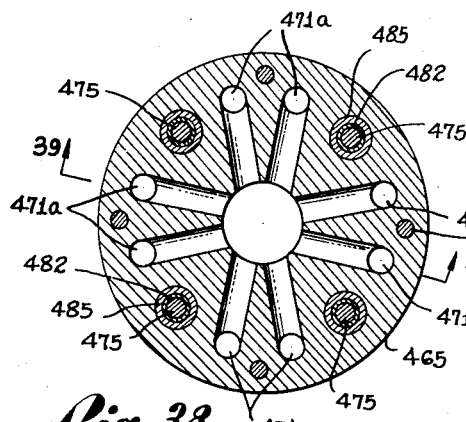
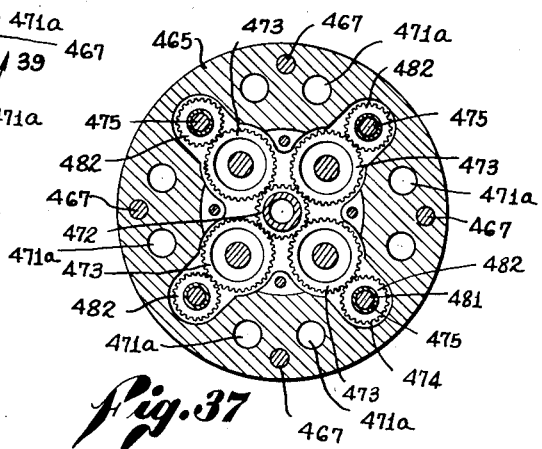
INVENTOR.
ALBERT G. BODINE JR.
BY
Attorney

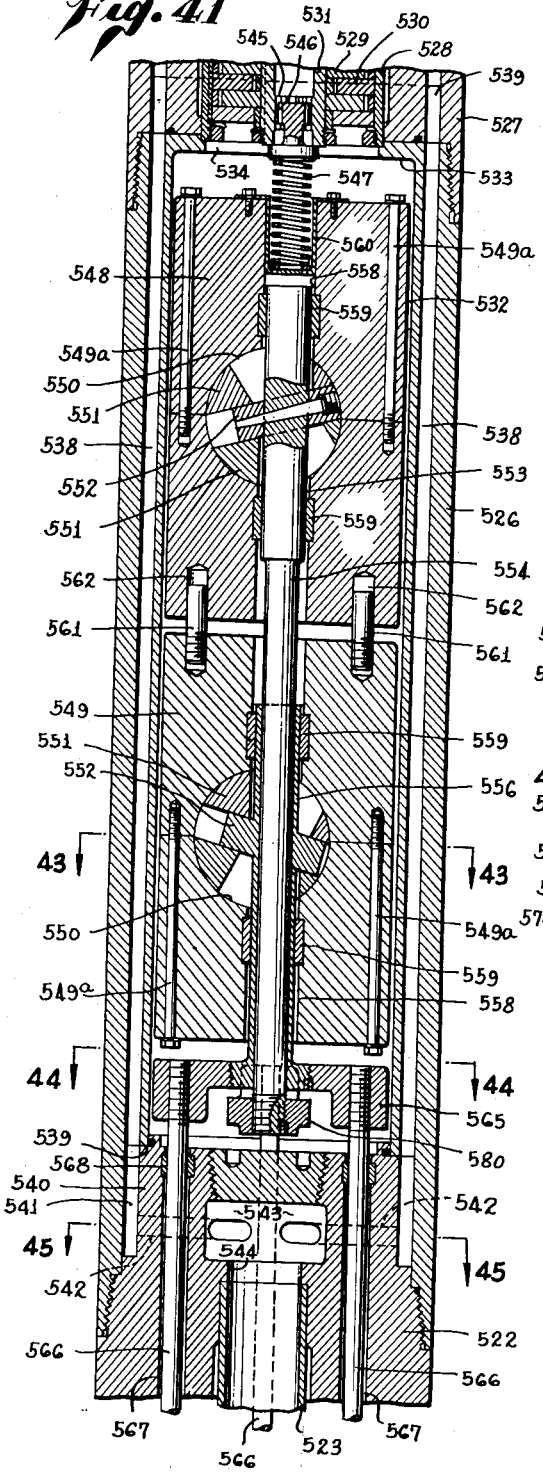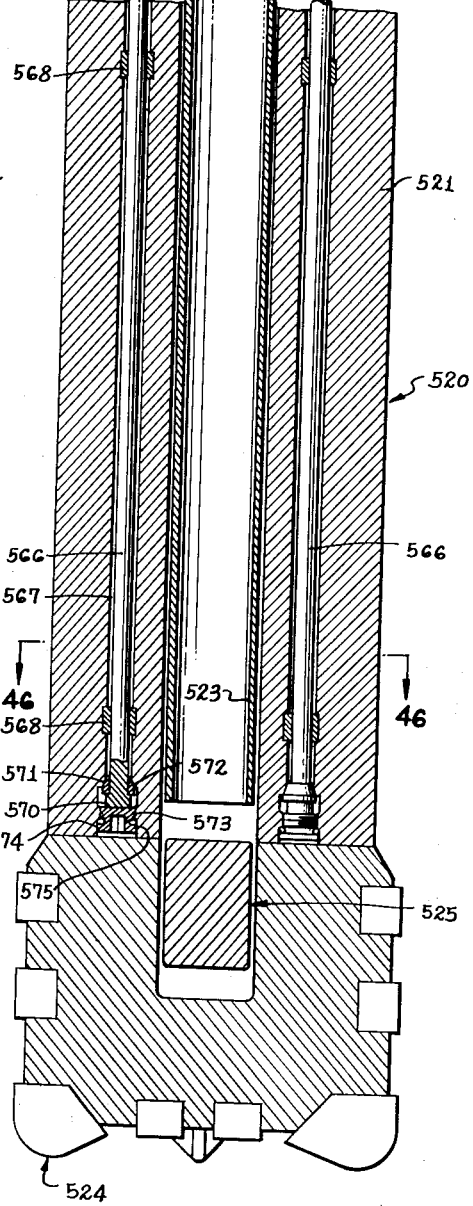

Feb. 7, 1961   A. G. BODINE, JR   2,970,660
POLYPHASE SONIC EARTH BORE DRILL
Filed July 12, 1954   15 Sheets-Sheet 13

INVENTOR.
ALBERT G. BODINE JR.
BY
Attorney

Feb. 7, 1961 A. G. BODINE, JR 2,970,660
POLYPHASE SONIC EARTH BORE DRILL
Filed July 12, 1954 15 Sheets-Sheet 14
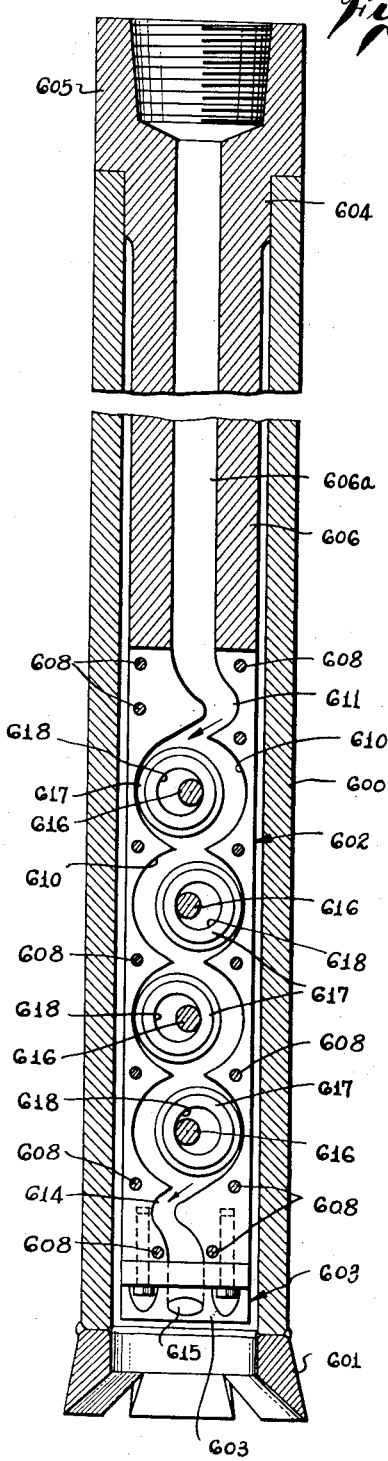
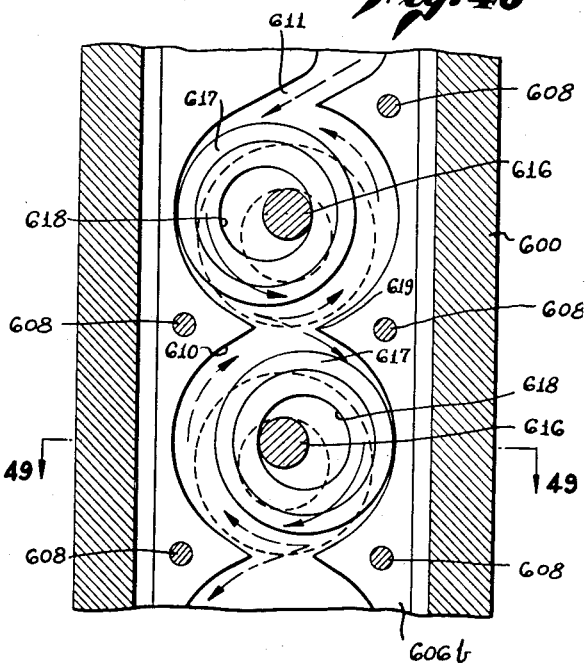
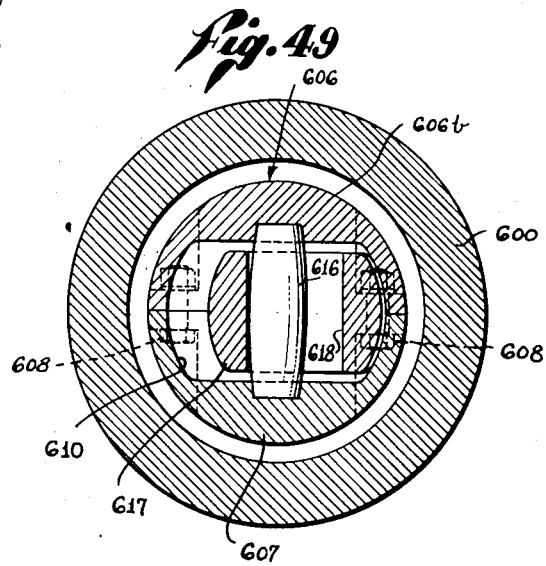
INVENTOR.
ALBERT G. BODINE JR.
BY
Attorney Feb. 7, 1961  A. G. BODINE, JR  2,970,660
POLYPHASE SONIC EARTH BORE DRILL
Filed July 12, 1954  15 Sheets-Sheet 15

INVENTOR.
ALBERT G. BODINE JR.
BY
Attorney

United States Patent Office 2,970,660
Patented Feb. 7, 1961

2,970,660

POLYPHASE SONIC EARTH BORE DRILL

Albert G. Bodine, Jr., Van Nuys, Calif.
(13120 Moorpark St., Sherman Oaks, Calif.)

Filed July 12, 1954, Ser. No. 442,805

31 Claims. (Cl. 175—55)

This invention relates generally to earth bore drilling and particularly to deep well drills of the "sonic" type, of the class disclosed in my United States Patent No. 2,554,005. The principles of the invention are applicable to the drilling of substances other than earthen formation, but its chief present application is to earth bore drilling and it will be illustratively described in that primary connection.

A "sonic" earth boring drill may be broadly defined as one having an elastic bar or rod connected to the bit and operated by setting up in such rod strong longitudinal elastic vibrations, thereby causing the bit to apply periodic stress variations to the formation being attacked. Apparently the formation, experiencing rapid stress variations of large magnitude, experiences elastic vibration, and gives way largely, if not entirely, by fatigue failure or cyclic overstressing. The sonic drill disclosed in my aforesaid Patent No. 2,554,005 usually comprises a long, heavy, elastic bar or rod (typically three 40′ drill collars coupled end to end) having mounted at its lower end a suitable bit, and at its upper end a vibration generator for setting the rod into elastic vibration in the fundamental longitudinal mode (ends "free"). The vibration generator comprises a motor, typically a hydraulic turbine driven by the drilling fluid, and a mechanical vibrator in combination therewith. The bit at the lower end, vibrated against the formation by the motion of the elastically vibrating rod subjects the formation to high stress elastic vibration and causes it to disintegrate.

Many of the problems involved in successful sonic drilling relate to delivery of sufficient power. One of the most serious of these is wastage of power owing to wave energy absorption by the deep column of surrounding drilling fluid. Another is wastage of power by transmission of wave energy up the drill string. Another is that the drill rod, when made up of several drill collars of conventional size, is prone to lateral vibration, putting a practical limit on the vibration energy which can be transmitted longitudinally through it.

Still another problem concerned with power delivery in sonic drilling arises from the fact that formation rock subjected to a periodic force presents to the vibratory driver a high load impedance. That is to say, the rock, forced to undergo elastic vibration, requires a relatively high periodic stress amplitude for a given velocity amplitude. Rock formation is often characterized by high volume modulus of elasticity, i.e., high elastic stiffness (low "compliance"), and also by high inertia, as well as high resistance, the latter made up of internal friction and radiation resistance. In acoustic terms, the analogous acoustic impedance Z of the rock is represented by the familiar equation $Z=R+jX$, where R is made up of all power consuming factors, friction and radiation, and X is the algebraic sum of the powerless or reactive components, inertial and capacitive, the latter owing to elastic stiffness. The analogous acoustic impedance is also represented by the ratio $$\frac{p}{vA}$$

where "p" is force exerted per unit area, "v" is velocity amplitude, and "A" is the area of the bit in engagement with the rock. As indicated above, the acoustic impedance for rock formation tends to be high, and from the immediately preceding relationship, it is seen that this denotes a high ratio of stress amplitude to velocity amplitude. It follows that, for effective drive of the formation by the vibratory bit, the bit must operate at correspondingly high impedance, meaning a high ratio of force amplitude to velocity amplitude.

The requirement stated in the preceding paragraph was satisfied in the drill of my said earlier patent by the use of the massive longitudinally vibratory drill rod connected to the bit, and the use, at the upper end of this rod, of a vibration generator capable of setting such rod into a fundamental mode of longitudinal elastic vibration. Driven by this massive vibratory drill rod, the bit performed as desired, i.e., with a high ratio of force amplitude to velocity amplitude, and a good impedance adjustment to the high impedance formation was thus achieved. This further required, however, a solution to the problem of effectively driving the massive vibratory drill rod from a generator device such as could be in turn powered from practically available means for transmitting power down the drill hole from the ground surface. One of the best available such means was deemed to be the conventionally used stream of drilling fluid pumped down the drill pipe. The stream of drilling fluid flowed at substantial volume velocity, but was at relatively low pressure. Sufficient work could be obtained from it, but its low pressure state was unsuitable for direct drive of the short-stroke vibratory rod (using, for example, a simple cylinder and piston assembly), because the vibratory motion of the massive vibratory drill rod required a much higher ratio of driving force to velocity than could be thus attained. A transformation of the low pressure-high velocity form of power available from the drilling fluid to one of high pressure-low velocity was discovered to be a solution, and can be understood best by use of the concept of "impedance adjustment." The familiar impedance concept was probably derived originally in the analysis of vibratory systems, and impedance matching or adjusting is ordinarily thought of only in connection with the intercoupling of a vibratory driver to a vibratory driven member. I found in this investigation, however, that the same basic concept of the impedance adjustment problem was encountered in the coupling of the unidirectional stream of drilling fluid (under pressure from a mud pump operated by an engine) to my massive vibratory drill rod. The problem of "impedance adjustment" thus identified was solved by the use of a vibration generator comprising a motor component having a low force-high velocity input characteristic, such as a turbine, and a mechanical vibrator driven thereby and attached to the vibratory rod, such device being capable of translating the low force-high velocity input power available from the drilling fluid into high force and low velocity at the point of coupling to the rod. The device thus introduced force gain and correlative velocity reduction, and was a form of impedance adjustment permitting effective drive of the relatively high impedance vibratory rod by the relatively "low impedance" drilling fluid. The most powerful forms of my present drill incorporate the same, or equivalent, impedance adjusting feature.

The general object of the present invention is the provision of a sonic drill having improved solutions for the problems enumerated above.

A particular object is the provision of a sonic drill which eliminates entirely the problems of large loss of wave energy into the drilling fluid, and up the drill string.

A further particular object is the provision of a sonic drill so compact, shortened and dynamically balanced as to greatly reduce the tendency toward lateral vibration, making possible more highly stressed vibratory parts and therefore a design which can operate at increased horsepower. In this connection, an object is the provision of a drill so inherently powerful that the impedance adjusting feature of my aforesaid earlier drill, while still important for maximum performance, can for some less-than-maximum effort applications be optionally omitted.

An important feature in sonic drilling is that the drill bit be pressed downward against the formation with a heavy "biasing" pressure, so that the stress cycle will involve alternate positive and negative pressure excursions above and below this biasing pressure as a mean. The higher the biasing pressure, the more stressed is the rock, and the more effective is the stress cycle in bringing about fatigue failure. A further object of the invention is the provision of an improved type of sonic drill which readily lends itself to any desired increased extent of bias loading.

Still a further object of the present invention is the provision of an exceedingly powerful sonic drill which is greatly shortened as compared with my earlier drill, and which can be easily shipped in fully assembled condition, and installed as a unit.

A simple illustrative form of the drill of the present invention comprises two massive elastic rods or bars arranged side by side and joined at the upper end by a unitary head, forming a close U-shaped structure, or two-legged or two-pronged fork. A vibration generating means is provided for generating elastic, 180° opposed, longitudinal vibrations in these legs, prongs, or bars. Such vibrations of the bars consist of alternating elastic elongations and contractions, produced or characterized by alternating tensile and compressive stresses acting longitudinally along the bars. While there are various ways in which this can be done, an illustrative arrangement comprises a mechanical vibrator connected to one of the legs at some distance down from their juncture, preferably well toward the lower end. If desired, individual but properly synchronized vibration generators can be connected to all of the legs. A drill bit is mounted on the lower end of one of the legs, or bits can be mounted on the lower ends of both legs.

This assembly is suspended in the well bore by a suitable drill string coupled to the head at the upper end juncture of the legs. Each of the legs is then capable of elastic vibration in a longitudinal direction as a "fixed-free" bar of quarter wavelength, or odd multiple thereof. Assuming the usual quarter wavelength mode, this vibration is at maximum amplitude if the bar or leg is driven at the resonant frequency for its length determined by the expression $$f = \frac{S}{4L}$$

where S is the speed of sound in the material of the elastic bar and L is its length.

From fundmental theory, it is known that in either a lumped constant longitudinally vibratory elastic system (one wherein the mass is concentrated in one or more relatively enlarged bodies and the elasticity exists mainly in a bar relatively slender for its length), or a uniformly distributed constant system (one comprised of an elastic bar along which the constants of mass and elasticity are uniformly distributed), the frequency for resonant longitudinal vibration depends upon the mounting conditions and upon the distribution or location of the constants of mass and elasticity which coact in the determination of this frequency. When two bars are joined to one another at a head, and their constants of mass and elasticity are uniformly distributed therealong, the resonant frequency for longitudinal vibration is governed by $$f = \frac{S}{4L}$$

where L is the length of each bar, and both legs vibrate at the same resonant frequency. Where the location of mass and elasticity constants is not uniform along the bar, and the system partakes of lumped constant character, the equation $$f = \frac{S}{4L}$$

no longer predicts the exact resonant frequency; but the resonant frequency is still governed by the mass or masses of the vibratory bars, the elasticity constant, and the location of the constants of these factors along the system. Broadly, the basic requirement of the present invention is that the location and the value of the constants of coacting vibratory mass and elasticity, or elastic stiffness, along both (or all) legs be such as to produce a structure wherein said legs, each and all, have resonant longitudinal vibration at a single or common resonant frequency. The vibration generator is then driven at this same resonant frequency.

Assuming a simple form in which but one leg of a two-legged fork structure is directly driven by an individual vibration generator, such elastic vibration is set up in the directly driven leg by operating the vibration generator at the frequency "$f$." In such vibration, the head or upper end juncture of the legs remains almost stationary, and the directly driven vibrating leg alternately elongates and contracts at the frequency "$f$." In terms of resonant standing waves, a velocity anti-node (region of maximum motion) exists at the lower end of the driven leg, and a stress anti-node (region of practically no motion) exists at its upper end. Cyclic stresses thus set up at the upper end juncture of the legs so react on the upper end of the other leg that sympathetic longitudinal elastic vibrations, like those in the leg to which the vibrator is immediately connected, are set up in the other leg, but at 180° phase difference. The result is that both legs undergo alternate elastic elongation and contraction, their joined upper ends standing substantially stationary, and their free lower ends reciprocating, the motions of the two legs being similar but at 180° phase difference, so that the lower end of the one leg is elevating while the lower end of the other is descending, and vice versa. The amplitude of motion of different points along the legs will be found to be progressively decreasing from a maximum to a minimum (or zero) at successive locations in the upward direction. This process occurs in such a way that the longitudinal components of forces in the two bars owing to alternating accelerations and decelerations are substantially equal and opposed, and therefore effectively cancelled at the head structure, which accordingly stands substantially stationary. An alternative (the usually preferred form) is to use a mechanical vibrator for each of the two legs or bars, the two vibrators being driven at 180° phase difference. In this case, the same type of vibratory action is established as before, but each leg is driven by an individual vibrator. Assuming a separate bit on each leg, the two bits exert 180° opposed pressure cycles on the two areas of the hole bottom which they respectively engage. Assuming a bit on but one of the legs, this leg exerts its pressure cycle on the formation in the general manner of the drill of my aforesaid patent, the other leg being free to undergo relatively undamped vibration. This undamped second leg improves the "Q" of the system as a whole ("Q" being understood to denote the relation of energy stored to energy expended per half cycle, and denoting a desirable property analogous to the effect of a flywheel in a rotational system).

It should be seen that, the upper end of the fork structure standing substantially stationary during operation, the device is inherently effectively isolated from the supporting drill string, and wastage of energy by transmission of waves up the drill string is virtually eliminated. Analyzed acoustically, I have provided a plurality of coupled acoustic circuit elements (acoustic vibratory bars) operating with a balanced phase difference and joined at respective high impedance regions to achieve a non-vibratory support point, which is therefore incapable of transmitting vibrational energy into the means of support.

I have also, as a further major feature, associated two vibratory low impedance regions of the acoustic circuit elements (acoustic bars) in a polypole arrangement which virtually eliminates acoustic wave radiation into surrounding fluid. The problem of energy absorption from the drill by the surrounding drill fluid was discussed in my aforesaid patent. Briefly, it results from the drilling fluid becoming acoustically coupled to the drill, with powerful sound waves radiated into the drilling fluid and transmitted up the bore hole outside the drilling apparatus. Such power absorption is much greater than would at first be guessed, particularly at great depths, and I have equipped my earlier sonic drills with various forms of acoustic drill fluid "decouplers" to reduce this serious loss in deep hole drilling. The present drill is inherently decoupled from the drilling fluid, because as one leg moves downwardly, displacing drilling fluid before it, the other moves upwardly, and vacates a space just sufficient to accommodate the fluid displaced by the first leg. Accordingly, there is a lateral sloshing of drilling fluid back and forth but no cyclic compression, and therefore, no wave up the bore hole. Acoustically speaking, the two legs form a dipole, which is inherently incapable of sound wave radiation. The problem of power loss by coupling to the drilling mud fluid is thus eliminated.

It will be evident from the foregoing that the drill of the invention is dynamically balanced in the longitudinal direction. Complete dynamic balancing to minimize lateral components of vibration is accomplished in any of several different ways. One comprises making one of the legs hollow, and placing the second inside and on the axis of the first. Others will be described.

Because of the dynamic balancing and compactness of the present drill, it can be subjected to higher stresses, and can utilize more powerful vibrators. The energy savings effected by reason of eliminating the problems of energy loss up the drill string and into the drilling fluid, plus the increased power for which the present type of drill can be readily designed, result in delivery of greatly increased vibratory energy to the formation. This increase is sufficient, as already mentioned, that the problem of impedance adjusting of the generator is not so great as with earlier sonic drills, though it will be appreciated that adequate impedance adjustment is always a valuable asset and is ordinarily preferred.

In general, the forked elastic bar structure is one-half the length of that of the drill of my earlier patent, for equal operating frequency, and additional space savings have been made, as will later appear, so that the drill as a whole is sufficiently short and compact that it can be shipped or trucked fully assembled.

Reference is now directed to the drawings in which:

Fig. 1 is a perspective view of an illustrative embodiment of the invention;

Fig. 2 is a section on line 2—2 of Fig. 1;

Fig. 3 is a section on line 3—3 of Fig. 1;

Fig. 4 is a bottom elevational view of the embodiment of Fig. 1;

Fig. 5 is a fragmentary diagrammatic perspective of the embodiment of Fig. 1;

Fig. 10 is an elevational view, partly in section, showing another embodiment of the invention;

Fig. 11 is a longitudinal medial section of the embodiment of Fig. 10, extending downwardly to a point just below the head of the fork structure;

Fig. 12 is a longitudinal medial section of the lower end portion of the embodiment of Fig. 10;

Fig. 13 is a section taken on line 13—13 of Fig. 12;

Fig. 14 is a bottom elevational view of the embodiment of Fig. 10;

Fig. 15 is a section taken on line 15—15 of Fig. 12;

Fig. 16 is a section taken on line 16—16 of Fig. 13;

Fig. 17 is a section taken on line 17—17 of Fig. 13;

Fig. 18 is an elevational view of a present preferred embodiment of the drill of the invention;

Fig. 22 is a section taken on broken line 22—22 of Fig. 20;

Fig. 23 is a sectional view taken on line 23—23 of Fig. 20;

Fig. 24 is a sectional view taken on line 24—24 of Fig 20;

Fig. 25 is a medial sectional view of the drill taken on section line 25—25 of Fig. 24, and extending downwardly from the lower portion of the drill as seen in Fig. 20, the plane of the view being at 45° to that of Fig. 20;

Fig. 26 is a section taken on line 26—26 of Fig. 25;

Fig. 27 is a sectional view of a portion of the drill shown in Fig. 20, but taken on section line 27—27 of Fig. 23 so as to reveal certain mud flow passages;

Fig. 29 is a section taken on line 29—29 of Fig. 21;

Fig. 30 is a bottom elevational view of the embodiment of Fig. 18;

Fig. 31 is an elevational view of another embodiment of the invention;

Fig. 32 is a longitudinal sectional view of the upper end portion of the drill taken in a plane at 45° to the plane of the paper as seen in Fig. 31;

Fig. 33 is a sectional view of the lower end portion of the drill, in the same plane as Fig. 32;

Fig. 34 is a section taken on line 34—34 of Fig. 32;

Fig. 35 is a section taken on line 35—35 of Fig. 32;

Fig. 36 is a section taken on line 36—36 of Fig. 32;

Fig. 37 is a section taken on line 37—37 of Fig. 32;

Fig. 38 is a section taken on line 38—38 of Fig. 32;

Fig. 39 is a vertical longitudinal section through a medial portion of the drill, taken on line 39—39 of Fig. 38;

Fig. 40 is a section taken on line 40—40 of Fig. 33;

Fig. 41 is a vertical longitudinal section of a medial portion of a modified drill, extending downwardly from the turbine shaft bearings to the upper portion of the fork structure;

Fig. 42 is a vertical longitudinal section of the lower portion of the drill of Fig. 41, in the same plane as Fig. 41;

Fig. 47 is a longitudinal vertical section of a simplified form of drill in accordance with the invention;

Fig. 48 is an enlarged detail taken from Fig. 47;

Fig. 49 is a section taken on line 49—49 of Fig. 48;

Figure 7:
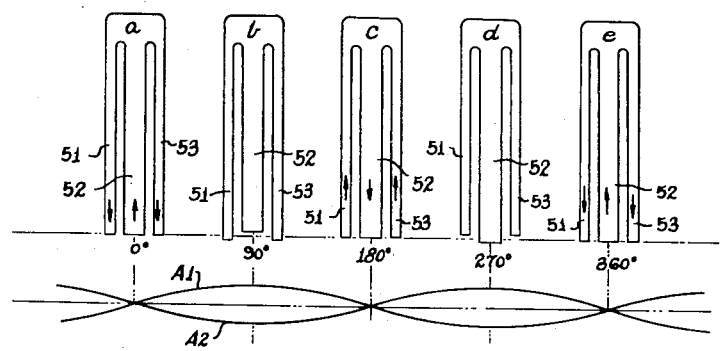
Fig. 7 is a diagram showing successive positions of one illustrative form of the invention.

Figs. 1–5 show a simple illustrative form of the drill, of an electro-magnetic type, not using the frequently preferred type of mechanical vibration generator referred to in the preliminary discussion, but rather a very simple arrangement which sets the legs of the fork structure into vibration by an oscillating electro-magnetic field established across an air gap between vertically overlapped pole pieces at the lower end portions of the legs. In this form the wave generating means is actually distributed in its location throughout the elastic fork structure.

Referring now to Figs. 1–5, numeral 50 designates generally a drill comprising a ferromagnetic fork structure including three parallel laminated elastic bars or legs 51, 52 and 53, each, in this instance, of rectangular cross-section, united by an integral rectangular head 54. This structure is comprised of an assembly of thin sheets some elastic material of high magnetic permeability and of good elastic fatigue properties, as vanadium steel. The three legs 51, 52 and 53 are positioned side-by side, spaced apart as shown, and the cross-section of the central leg 52 is preferably double that of each of the outside legs 51 and 53.

A step-down transformer 55, having primary and secondary windings 56 and 57, respectively, is mounted on top of head 54, cleats 58 supporting the fork structure from the transformer, and the assembly is suspended through a stirrup 59 and link 59a from a socket 60 hung from the drill string, which in this instance, is a flexible steel cable 61. In this cable is placed an insulated stranded copper conductor 62, whose lower end is connected to one side of transformer primary winding 56, and the other side of the latter is connected by wire 63 to ground on socket 60, as at 64.

The secondary winding 57 of transformer 55 is connected by leads 65 and 66 to a coil 67 surrounding the center leg 52 of the fork, and by this means, the center leg is periodically magnetized, and a cyclic magnetic circuit is established from the upper end of the center leg both ways through head 54, down outside legs 51 and 53, and across magnetic gaps 70 to the lower end of center leg 52. As arranged, the magnetic polarity of the lower end of the center leg will be opposite to the magnetic polarity of the lower end portions of the two outside legs, so that the center leg on the one hand, the two outside legs, on the other, will experience a force of magnetic attraction across the intervening air gaps 70. The conductor 62 is energized at the ground surface from an alternating current power source, and the step down transformer 55 increases the current supplied to coil 67 to give sufficient ampere turns for the necessary magnetization of the described fork structure. The design of these circuits is well within the skill of the art and will not be further dealt with herein. The gaps 70 are so arranged that when the magnetic circuit, as described, is energized, the two outside legs are pulled upward by the center leg, and the center leg is pulled downward by the outside legs. In the design here illustrated, the lower end of the center leg is bevelled on opposite sides, so as to form slanting pole faces 71, and the two outside legs are furnished with angular toe portions furnishing slanting pole faces 72 parallel to and somewhat spaced from the faces 71. In the illustrative design, the faces 71 and 72 are at about 60° with horizontal.

Keyed into appropriate notches 74 cut into the lower ends of legs 51 and 53 are the roots of outside rock bits 75, and intermediate rock bit 76 will be understood to be similarly mounted at the lower end of center leg 52. These bit members are secured to the respective legs by bolts such as 77, which also serve to hold the laminations of the fork structure in assembly.

The two outside legs 51 and 53 are held at a fixed spacing distance by a bolt 80 passing through the bit members 75 and 76, thick spacing washers 81 between each outside bit and the center bit, and a spacing sleeve 82 accommodated by an oversize aperture 83 in center bit 76 (see Fig. 3). The washers 81 are slightly less thick than the normal spacing distance between the outside and center bit members and if the center leg 52 should tend to bend to one side or the other in the operation of the drill, the corresponding washer 81 functions as a spacer and bearing. The spacers 81 and 82 are preferably fabricated from a wear resistant material of low magnetic permeability, such as stainless steel. The bit members are alloy bit steel, and are well spaced. These members accordingly do not strongly influence the magnetic field.

It can now be seen that energization of coil 67 sets up magnetic circuits in the center leg, around through head 54 and along both outside legs, and across the two diagonally disposed magnetic gaps 70. A pulsating force, accordingly, is set up across these gaps between the center leg and the two outside legs at double the frequency of the alternating current supplying the transformer. Since the outside legs are supported against movement toward one another, the horizontal component of these forces is ineffective. The vertical force components across the gaps, however, are effective to exert a tensile stress in, or pull down on the center leg and to exert a compressive stress in, or pull up on, the outside legs. On each force pulse, the center leg is, accordingly, elastically elongated, and both outside legs, pulled upwardly, are elastically contracted. In the relaxation intervals between successive force pulses, the center leg elastically shortens and experiences a tensile stress, and each outside leg elastically elongates and experience a tensile stress.

It will be seen that the net downwardly facing area of the two outside legs in the drill bore fluid is just equal to the net downwardly facing area of the middle leg, the bit structures included. This follows since above the gaps 70, the cross-section of the middle leg is exactly equalized by the total of the two outside legs; and while there are certain lateral enlargements below, giving upwardly facing areas, these are balanced by corresponding downwardly facing areas in their immediate vicinity. Accordingly, volumetric displacements owing to vibratory movement of the lower end of the middle leg are always equalized by equal and opposite volumetric displacements of the two outside legs, so that any drilling fluid displaced by downward movement of either the center leg or the two outside legs is accommodated by an equal space simultaneously vacated by the upwardly moving outside legs or center leg, as the case may be. There is, therefore, no tendency to send waves of compression and rarefaction up the bore hole through the drilling fluid, the drill being fully acoustically decoupled from the column of mud fluid. Analyzed acoustically, the drill is essentially a dipole, the two outside legs forming one pole and the inside leg the other pole. An acoustic dipole is of course incapable of wave radiation. For the case in which only one "pole" of the drill carries a bit, as mentioned hereinabove, the other "pole" retains the function of wave neutralizer. This inherent decoupling property of the present drill is a feature of very great importance, and solves a major problem heretofore encountered in sonic drill earth boring as substantial depths are approached.

The legs of the drill of Figs. 1–5 thus longitudinally elongate and contract, the two outside legs 51 and 53 moving together, and the inside leg moving with 180° phase difference from the outside legs. The periodicity will be seen to be double the frequency of the alternating current power source.

The length of the fork legs and the frequency of the power source are correlated to set up a condition of resonance substantially in accordance with the expression $$f = \frac{S}{4L}$$

It will be recalled that the frequency of fork oscillation will, in this embodiment, be double the frequency of the alternating current power source, so the expression, for this case, becomes $$f_{a.c.} = \frac{S}{8L}$$

where $f_{a.c.}$ is the frequency of the power source. Assuming 60 cycle power mains, and a speed of sound in the material of the legs equal to 16,000 feet per second, L, the length of the legs for quarter wave resonance, becomes approximately 33 feet. However, the drill of this embodiment is especially well adapted for higher frequency operation, and assuming a power source of 360 cycles, the fork legs are reduced to a length of between five and six feet, giving an extraordinarily compact structure.

In this quarter wavelength mode of vibration, velocity anti-nodes occur in the region of the lower end portions of the legs, and a stress anti-node exists in the stationary head structure 54. The head structure 54 thus stands substantially stationary during operation.

It will be seen that the effective dynamic center of gravity of the structure, as a whole (the juncture), tends to remain stationary. Assuming substantially uniform cross-sections for the legs throughout their length, and a cross-section for the middle leg equalized by the total for the two outside legs, the amplitudes of vibratory movement of the three legs will be equal.

If the center leg is not exactly twice the cross-section of the two outside legs, the stress anti-node at the head of the fork structure is displaced somewhat down the center leg or outside legs, whichever is the heavier. The head then no longer stands absolutely stationary, and the amplitudes of vertical oscillations of the center and outside legs are no longer exactly equal. The resulting slight vibration of the head can be prevented from transmission up the drill string by use of any isolation device, and the flexible cable here shown as a drill string is in any event a very poor transmitter for such vibrations, so no great energy will be lost. The volumetric displacements of the center and outside legs will remain equal, since a more massive central leg, for example, will have less amplitude of motion, but its cross-section will be greater, while the outside legs, though having greater stroke amplitude than the inside leg, will be of small cross-section. The volumetric displacements, accordingly, remain substantially equalized, so that the drill remains acoustically decoupled from the drill fluid.

It has been mentioned earlier that the legs of the fork are fairly massive in character, and this mass is of importance. This subject was discussed at length in my earlier Patent No. 2,554,005, where the importance of mass in the elastic drill rod was fully described. It is to be understood that the legs of the fork in the present drill may correspond closely with the elastic drill rod of the earlier patent. Briefly stated, the relatively massive, elastically vibratory fork legs provide a vibratory structure of high "Q," giving a high ratio of energy stored to energy dissipated per half cycle (analogous to flywheel effect in rotational systems); and, in addition, they have the ability by operating at resonance, to "tune out" other vibrating masses such as drill bit elements, or portions of the formation which may become "coupled in" to the vibratory system.

Figure 6:
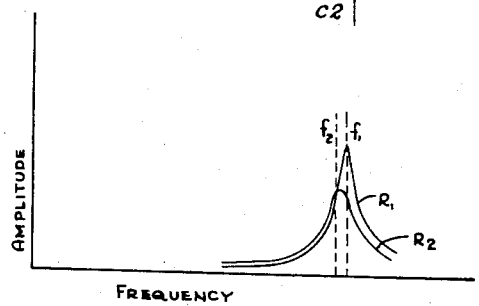
Fig. 6 is a graph showing the relationship between frequency and amplitude of vibration.

The high "Q" fork structure, operating at resonance, is capable of exerting a high alternating force against the formation. Fig. 6 illustrates in a general way the resonant behavior of various forms of the drill. The curve R1 is the resonance curve (vibration frequency vs. vibration amplitude) with the bit uncoupled from the formation. Assuming fundamental frequency quarter-wave operation, the frequency $f_1$ for the resonant peak is given by the equation $$f_1 = \frac{S}{4L}$$

It will be noted that the curve R1 is relatively tall and sharp, characteristic of a high "Q" system with small energy dissipation. Curve R2 shows a typical modification resulting from coupling of the drill to the formation. It is to be understood that the curve R2 is simply one of many that may occur in practice, depending upon the degree of coupling, which in turn may depend upon the weight of the drill assembly. First of all, the frequency $f_2$ for the peak of resonance is sometimes lowered somewhat from the value $f_1$. At the same time, the resonance curve becomes proportionately wider and less tall, typical of resonant systems from which substantial energy is being delivered. The greater energy delivery in this case is, of course, that expended in working on the formation. The figure also illustrates what I mean by the term "resonance." In this connection, I do not refer to the exact frequencies $f_1$ or $f_2$ for peak resonance values, but rather to the frequency ranges for substantial amplification of vibration amplitude, i.e., the frequency ranges included under the humped resonance curves R1 and R2. Also, it may be necessary to distinguish between the resonance frequency when uncoupled from the formation and the resonant frequency when coupled to the formation. The important resonant frequency of the fork structure, i.e., the frequency range of resonant amplification of the fork legs, is of course that corresponding to the coupled condition, and it is the latter resonant frequency, i.e., in the range under the curve R2, at which the power source should operate while drilling.

Figure 8:
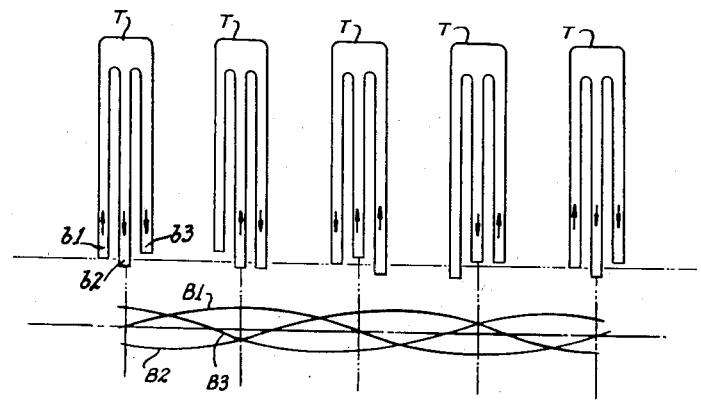
Figs. 8 and 9 are diagrams similar to Fig. 7 but representing two modified forms of the invention.
Figure 9:
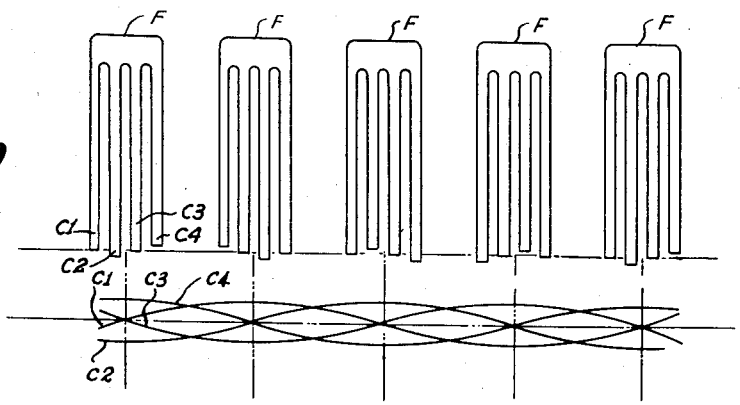

It will be seen from the foregoing that the center bit and the two outside bits, oscillating vertically at 180° phase difference, exert corresponding 180° opposed alternating compressive forces against the formation. From this standpoint, to distinguish the drill of the present invention from that disclosed in my aforementioned issued patent, I refer to the simple form of present drill as a symmetrical two-phase or dipole drill. The present usage of the expression two-phase is not to be confused with the expression two-phase as used in alternating currents, where the phases are in quadrature. In my drill the two phases are necessarily in 180° opposition and the drill is usually therefore properly characterized as symmetrical two-phase, or dipole. Still more boadly considered, the present drill may be characterized as symmetrical polyphase, and it may be set up as symmetrical two-phase, three-phase, four-phase, etc. For comparative purposes, I have included Figs. 7–9 showing, in diagram, three symmetrical polyphase cases, the first being two-phase, the second three-phase, and the third four-phase. By symmetrical polyphase, I of course refer to cases wherein the vibrations in different legs are out-of-phase, and the phase differences are substantially equal or neutralizing.

Referring first to Fig. 7 there is shown at A1 and A2 sinusoidal curves representing the deformation amplitudes of the legs or "poles" of one of my two-phase or dipole drills (for example, the drill of Fig. 1, wherein the two outside legs 51 and 53 comprise one pole and the center leg 52 the opposite pole). The drill legs are shown at successive 90° positions of the time cycle at $a$, $b$, $c$, $d$ and $e$. At $a$, $c$, and $e$ the three legs of the drill are at their normal length, while at $b$, central leg 52 is contracted and outside legs 51 and 53 elongated, and at $d$, the reverse is the case.

Fig. 8 shows the three-phase case, the curves B1, B2, and B3 representing the deformation amplitudes of three legs or "poles" b, b2 and b3, respectively, of an equal-legged tri-forked drill structure T. The five positions shown are again at successive 90° intervals of the time cycle, and it will be seen that the three equal legs are driven, by any suitable vibration generating means, now shown, to vibrate at 120° phase difference, that the three legs are dynamically balanced in the longitudinal direction, and that the volumetric displacements above and below the normal length, represented by the dot-dash line, are equalized. The vibration generating means may comprise phased generators in individual legs, as later described in connection with other embodiments of the invention. Lateral balancing can be achieved by forming two of the legs as concentric cylinders surrounding the third.

Fig. 9 shows the four-phase case, having a four-legged fork structure F, with the four legs c1, c2, c3 and c4 driven by suitable vibration generators (not shown) at 90° phase difference. The respective displacement curves for the four legs are represented at C1, C2, C3 and C4, and an inspection of Fig. 9 will readily disclose that longitudinal dynamic balancing, as well as equalization of the displacement volume above and below the level of the normal lower end position of the legs, has again been accomplished. The generators may again be placed in the individual legs. Dynamic balancing against lateral vibration can again be achieved through use of a concentric leg design.

Figs. 10–17 show a form of my dipole drill, employing a structure comprising a center leg and an outside tubular leg depending from a unitary head. This embodiment utilizes an unbalanced rotor type of vibrator in one leg, in this instance, in the lower portion of the center leg, and this vibrator is driven by a turbine which is located above the head of the structure and which is driven by the circulated mud fluid conventionally used in oil well drilling.

At 100 is designated a relatively long, steel tubular member, whose upper portion furnishes a housing for the turbine, and the remainder of which forms a portion of the head and the outside leg structure. This member 100 is formed at the top with a threaded box 101 for coupling to a conventional drill pipe string, not shown. In most cases, one or more standard drill collars are coupled to the upper end of the drill at box 101, giving added weight on bottom, and the conventional drill pipe is then coupled to the upper end of these collars. The lower end of the member 100 has a threaded box 102 into which is screwed the coupling pin 102a on the upper end of a cylindrical member 103 forming the lower end portion of the outside leg structure. This member 103 has a central longitudinal slot 104 running nearly from end to end, in which is received, with good clearance, a vibrator housing 105, later described in more particular. The lower end portion of body 103 is tapered outwardly, as at 106, to furnish a tubular lower extremity 107 of somewhat enlarged diameter, and inset in this lower extremity are hardened bit elements as indicated typically at 108.

The vibrator mechanism inside housing 105 is driven through a long vertical transmission shaft 109 from a mud driven turbine 110 housed in the upper end portion of tubular member 100. The bladed turbine stators 111 are supported within the tubular member 100 by means of a shoulder formed at 112, and the stators are separated by intervening spacers 113. Engaging the upper stator 111 is a sleeve 114, held in place by a retainer 115 screwed into box 101, and provided with radial vanes or ribs 116 supporting a central distributor hub 117 shaped to guide the mud fluid from above downwardly to the turbine blades, as indicated. The turbine shaft 120 has near its upper extremity a tapered section 121 on which is tightly mounted a turbine rotor head 122, the latter having a downwardly extending sleeve portion 123 formed with an outwardly extending flange 124 at its lower end. Mounted on sleeve 123 and supported by the flange 124 are the bladed turbine rotors 125, separated by spacers 126. A cap 127 engages the top rotor and the parts are held in assembly by means of a nut 128 screwed down onto the threaded upper extremity 129 of the turbine shaft. The blades of the stator and rotor of the turbine will be understood to be properly inclined, in accordance with conventional practice in fluid driven turbines.

The section 120a of the turbine shaft is furnished with suitable packing, as indicated at 130, carried by a reduced tubular upward extension 131 of a tubular bearing housing 132 annularly spaced inside the tubular exterior member 100 by positioning lugs 132a formed on said housing, the extension 131 being received, with clearance, inside the turbine rotor sleeve 123, as indicated. The annular space 134 between the bearing housing 132 and the outside tube 100 forms a channel for the mud fluid discharged from the turbine. Below the section 120, the turbine shaft has a flange or collar 135 furnishing a shoulder which engages a washer 136 supported by the inner race ring of the uppermost of a stack of roller bearings 137, the lowermost being retained by a nut 138 threaded on the shaft. The outer race rings of these bearings are received in a bore in the housing 132, and supported therein by a retainer 139.

Threaded into the lower end of bearing housing 132 is the reduced neck of an oil housing 140, of the same diameter as bearing housing 132, the mud fluid channel 134 thus continuing down around the outside of the housing 140. The turbine shaft 120, whose lower end portion 120b reaches down into oil housing 140, has a longitudinal bore 145 extending downwardly through its lower end from a point just below collar 135, and this bore is tapered downwardly within the portion 120b of the shaft, as indicated at 146. The turbine shaft portion 120b is also tapered downwardly, and its lower end is formed as a spur gear 147 meshing with internal gear teeth 148 in a cup-like coupling member 149 tightly mounted on the upper end of transmission shaft 109. Oil ports 150 are provided in the lower portion of cup 149.

Oil is maintained in housing 140 to such a level as indicated at L, and is supplied through ports 150 to the bottom end of the hollow turbine shaft. The aforementioned washer 136 is radially drilled, as at 151, and the turbine shaft is formed with drill holes 152 establishing communication between the interior of the hollow shaft and the drill holes in the washer. When the turbine shaft rotates, oil climbs in the tapered portions of the bore through centrifugal force, and fills the hollow turbine shaft up to the level of the drill holes 152. Oil is forced out through the drill holes 152, and thence out tnrough the drill holes 151 in washer 136 to lubricate the bearings.

The lower end of oil housing 140 is flanged and bolted, as indicated at 154, to corresponding flange formations on the upper end of a long, generally cylindrical steel shank or rod 155, which forms a portion of the head and center leg structure of the fork. The upper end portion 155a of this shank or rod 155 has a long downward taper 156 and engages a complementary taper 157 on the inside of tube 100. The parts 155 and 100 are pressed or driven together to produce a tight wedge fit, and thus become structurally integrated to one another in the region of the tapered joint. This region of said members comprises the head structure 158 of the device.

Just below the taper, the internal diameter of bore member 100 is enlarged, as indicated at 159 (Figs. 10 and 11), to provide a "crotch" and an annular mud fluid channel 160 between the members 100 and 155. This channel 160 receives mud fluid from channel 134 via a suitable number of passages 161 extending through the upper end portion 155a of the shank 155, as clearly shown in Fig. 11. The channel 160 is continued for a short distance down into member 103, as at 160a (Fig. 12), where communication is had via port 161a with two longitudinal mud slots 162 formed in opposite sides of the member 103 (see also Fig. 16). The mud slots 162 are closed on the outside by cover plates 163 welded in position, as indicated, and discharge at their lower ends, via ports 164, into the space inside the lower tubular extremity 107 of member 103, from which final discharge takes place at the bottom of the well hole.

The shank 155 has a central bore 166, extending downwardly from a similar bore 167 through the bottom of oil housing 140 and these bores receive bearing bushings 168 for transmission shaft 109, the bushings being spaced by sleeves 169. A plug 170 screwed into the top of bore 167 holds the bushings and spacers in assembly at the top, and has sufficient clearance with shaft 109 to pass oil from housing 140 down into the space 171 around the shaft.

Press fitted on the lower end of shaft 109 (Fig. 12) is a drive sleeve 172 having internal splines 173 meshing with splines 174 on vibrator drive shaft 175. The lower end of shank 155 is formed with an internally threaded box 180 to receive a threaded pin 181 on a flanged head member 182 at the upper end of the vibrator housing 105.

The vibrator housing is longitudinally split into two halves 105a and 105b, bolt connected as at 183 (Figs. 12, 13 and 17). The two housing halves are formed with a plurality of mating shaft portions 184, surrounded by bushings 185, and journalled on these bushings are eccentrically weighted vibrator rotors 187. In the illustrated embodiment, there are four such rotors 187, all in vertical alinement, and interconnected by suitable gears. Each rotor is formed with a spur gear 188, and the spur gears of the two upper rotors are in mesh with one another, as are the spur gears of the two lower rotors. The lower gear of the upper pair is interconnected with the upper gear of the lower pair through an idler gear member 189. The gear on the upper rotor is driven from the vibrator drive shaft 175 through a gear set 190. The weights W of the unbalanced rotors are positioned so that all move vertically in unison, which is accomplished if for instance they are all initially positioned with their weights at the bottom, as in Fig. 13. It will be evident that each eccentrically weighted rotor will exert a thrust at its bearing as it rotates. Only the thrust in the vertical direction is, however, useful. By arranging the rotors in pairs of oppositely rotating members, the vertical components of thrust are additive, while the lateral components are cancelled. Also, by use of the idler 189, the two inside rotors turn in the same direction, and the two outside rotors also turn in the same direction, thus achieving balance against couples.

Vibrator shaft 175 is journalled in suitable bearings contained in a bearing housing 196 received in a bore 197 formed in the upper end of vibrator housing 105, the housing 196 having at the top a flange 198 engaging the top end of housing 105. A packing retainer 199 has a similar flange 200 engaging the flange 198, and this retainer contains suitable packing 201 around the shaft 175 to prevent oil from above leaking down into the inside of the vibrator housing. A packing retainer cover 202 is placed between the flange 200 and the aforementioned head member 182 (Fig. 13), the parts being secured in assembly by means of screws 205 passing down through head member 182, cover 202 and flanges 200 and 198 to engage in threaded sockets in the two halves of the vibrator housing.

A flanged fitting 210 is secured to the lower end of housing 105, as by screws 211, and has a threaded coupling pin 212 engaging the threaded box 213 of an inside bit member 214, the latter being provided, in this instance with a hardened insert blade 215 extending transversely across the space inside the outside tubular part 107. The bit element 215 is here shown as elevated somewhat above the outside bit elements 108, being designed to disintegrate large fragments of formation initially broken free by action of the outside bit elements 108. It will be evident, however, that the bit element 215 may alternatively be placed on a level with the elements 108, and no limitation to the illustrated arrangement is accordingly to be implied. Also, as explained earlier, the bit element 215 may be omitted, leaving the outside bit to do the work on the formation, the inside leg then being less damped, and contributing greater flywheel effect to the system as a whole. Moreover, the drill can be arranged with a bit only on the inside leg, so that the outside leg functions as a counterbalancing vibrator, with minimum damping.

It will be seen that the drill of Figs. 10–17 forms a structure having a central leg formed by the shank 155 and vibrator, and an outside leg structure comprised of the centrally slotted body 103 and the portion of the outside tubular member 100 below the juncture of the latter with the shank member 155. The region of the member 155 and the member 100 wherein said members are integrated structurally to one another, in this instance by the long taper joint at 156, 157, forms the head structure 158 of the device. The length of the legs below the head structure, i.e., from the crotch 159 to their lower extremities, has an essential relationship to the frequency at which said legs will vibrate, as mentioned earlier. For an operating frequency of 120 cycles per second, this leg length should be approximately 33 feet.

Operation is as follows: the turbine is driven by mud fluid pumped down the usual drill string, the mud fluid being eventually discharged to the bore hole at the bottom, and forming a fluid column rising to the ground surface around the drill string, in the usual way. The turbine shaft 120 drives the vibrator connected to the lower end of the central leg of the structure through the connections previously described, causing the vibrator to create an alternating force in a vertical direction at a frequency dependent upon the speed at which the turbine is driven by the mud flow. This speed is governed by the rate at which mud fluid is pumped through the drill stem at the ground surface. The vertical alternating force developed by the vibrator is exerted on the lower end of the shank 155, which comprises the central leg of the structure setting up alternating tensile and compressive stresses therein. When the turbine is driven at such speed that the vibrator frequency approaches or coincides with the resonant frequency of the device (see Fig. 6), the shank 155 vibrates in the vertical direction with substantial amplitude. This frequency for resonant operation is, as stated earlier, given by the ratio $S/4L$, where $S$ is the speed of sound in the material of the structure and $L$ is the length of the legs. Each of the legs is capable of elastic vibration in a longitudinal direction as a "fixed-free" bar of quarter wavelength, or odd multiple thereof, assuming it to be acted upon by an alternating force of resonant frequency. Such resonant elastic vibration is set up in the central leg by direct drive from the vibrator when operated at the resonant frequency. A velocity antinode then exists at the lower end of the central leg, and a stress antinode exists at its upper end, at the head or upper end juncture of the legs. The cyclic stresses so set up in the head or upper end juncture of the legs so react on the upper end of the outside leg structure 100—103 that sympathetic longitudinally elastic vibrations, like those in the central leg to which the vibrator is directly connected, are set up in the outside leg structure, but at 180° phase difference. The result is that both the inside and outside leg structures undergo elastic elongation and contraction in response to the alternating tensile and compressive stresses set up therein, their joined upper end structures standing substantially stationary, and their free lower bit-carrying ends reciprocating, the motions of the two leg structures being similar but at 180° phase difference. Thus the bit element carried by the central leg is elevating while the bit element carried by the lower end of the outside leg structure is descending, and vice versa.

The drill of Figs. 10–17 incorporates a velocity-reducing and force-gaining impedance adjustment between the turbine and the vibratory leg structure which is analogous to that described in full detail in my aforesaid Patent No. 2,554,005, and referred to in the introductory part of the present specification. The principles of impedance adjustment preferably incorporated in my sonic drills are fully described in said earlier patent and need only be briefly mentioned herein. Suffice it to say that the turbine rotors, at the radius of the blades, operate at high speed, but relatively low torque. The vibratory eccentric weights of the rotors, driven from the turbine, also rotate at relatively high speed, but low torque. However, the structure driven by the vibrator rotors, i.e., the vibratory legs of the structure, experience the periodic centrifugal force of large magnitude generated by the rotors against their bearings. These legs are both massive and elastically stiff, and are capable of only a small fraction of an inch of vibration amplitude at their lower ends, notwithstanding high force application by the vibrator. Vibrating at maximum amplitude, the velocity of motion of the lower end portions of the legs is very much reduced as compared with the linear speed of the blades of the turbine rotors. This speed reduction is accompanied by a correlative gain in force, because here the aforementioned high centrifugal rotor force is utilized, with the result that the vibratory legs of the device experience and apply to the formation a force of magnitude many times greater than that which exists at the turbine blades. There is thus achieved the advantageous degree of force application from bit to formation, with bit velocity and displacement amplitude limited to reasonable correspondence with that of which the formation itself is capable, so that good impedance adjustment to the impedance characteristics of the formation is provided. This is a considerable advantage even though it is not essential in all forms of the invention.

The drill as thus described also has the same advantage as mentioned in connection with the first described embodiment as regards elimination of the problem of acoustic coupling to the mud fluid column in the well hole. Moreover, as compared with the drill disclosed in my aforesaid Patent No. 2,554,005, the length has been halved for a given operating frequency. Other savings in length have been effected by reason of the fact that the head structure of the device does not vibrate during the operation of the drill, so that previously used provisions for isolating the drill from the drill string are no longer required. The leg structure is symmetrical and dynamically balanced, so that tendency for lateral components of vibration is reduced.

In Figs. 18–30 I have shown an illustrative embodiment of the invention wherein an elastic vibratory fork structure has a cluster of four legs, symmetrically disposed about the longitudinal axis of the fork, but which again is of the dipole class. The legs are arranged in two pairs of diametrically opposite legs, the two members of each pair moving in unison, and the pairs moving with 180° phase difference. An individual vibrator is in this case shown at the lower end of each leg, the vibrators being synchronized for the desired phase relations.

Referring first to Fig. 18, the steel four-legged fork structure is designated generally by numeral 230, and comprises a head portion 231 and four individual legs 232 depending from the head structure (see also Figs. 24, 25 and 26). It will be seen clearly from Fig. 26 that the four legs 232 are grouped symmetrically about the center axis of the drill, each occupying approximately a 90° quadrant as viewed in cross section, as in Fig. 26. Adjacent legs have lateral surfaces 233, spaced from one another as shown, and an enlarged crotch 234 is formed between adjacent legs at the juncture with the head structure 231. The exterior diameter of the four legs taken as a group is typically 10¼″. The inside surfaces 235 of the several legs define an annular opening 236 for a later described mud fluid pipe 237.

To the lower ends of the four legs 232 are connected individual vibrators 238, which in effect form downward extensions or lower end portions of the legs, and to the lower ends of the vibrators 238 are connected suitable bit members 239 and 240, each connecting two diametrically opposed legs. These bit members, shown in Figs. 21, 29 and 30, will be described in more particular hereinafter.

Connected to the upper end of the head 231 of the fork structure 230 is a two-part oil reservoir and gear housing unit 242—243 (Figs. 18 and 20), and immediately above is a bearing unit 244 and turbine unit 245. Connected to the upper end of the latter is an oil cylinder unit 246, above which is a mud fluid strainer unit 247.

The member 247 has at the top a coupling member 248 formed with a threaded box 249 adapted to receive the coupling pin of a drill collar or sub on the lower end of a conventional drill stem such as ordinarily employed in rotary drilling practice, these parts not being shown because of their familiar nature. It is to be understood that, for purpose of exerting good weight on the bottom of the hole, several conventional drill collars may be used above the drill, i.e., between the coupling member 248 and the drill pipe, these collars also being omitted from the drawings.

Coupling member 248 has at the bottom a threaded pin 250 screwed into a threaded box member 251 welded to the top end of the tubular housing 252 of the strainer unit 247. To the lower end of the housing 252 is welded a coupling member 253 provided at the bottom with threaded coupling pin 254 adapted to be screwed into a threaded box 255 at the upper end of oil cylinder unit 246.

The threaded pin 250 of coupling 248 at the top of the strainer unit has a downward tubular extension 257, to which is secured a slotted strainer tube 258, the latter being annularly spaced inside housing 252 to form an annular mud flow channel 259, and the tube 258 being fromed with a suitable number of slots 260 capable of freely passing the mud fluid but designed to strain out any articles which may have accidentally become entrained in the mud fluid stream pumped down the drill stem. It is of course evident that any hard particles of sufficient size to become wedged between the blades of the turbine would do the latter substantial damage. The strainer is a safeguard against this contingency.

Figure 19:
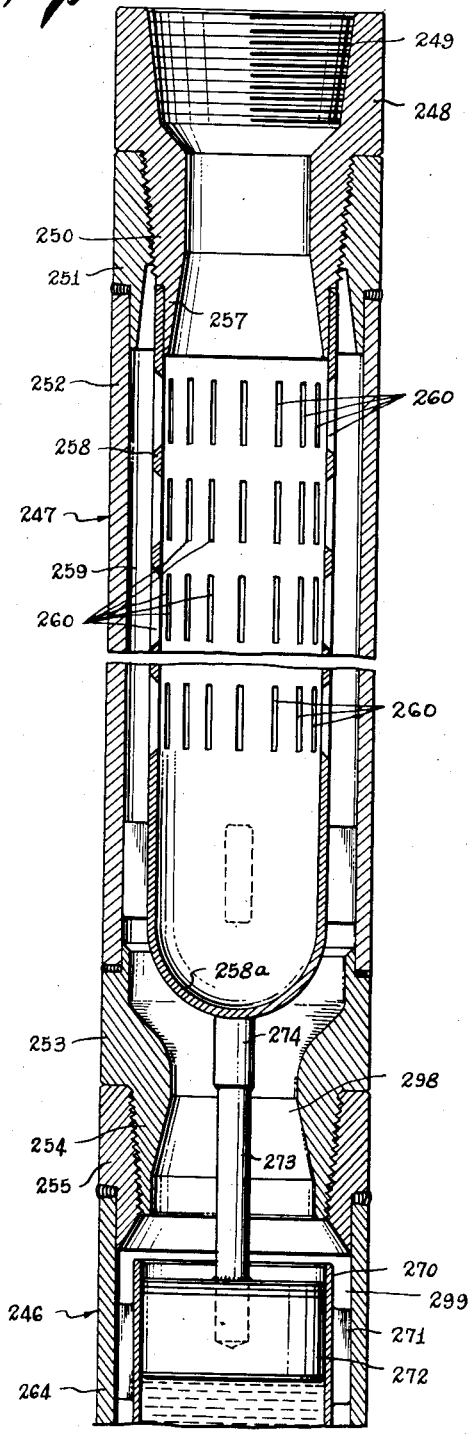
Fig. 19 is a vertical medial section of the upper portion of the drill of Fig. 18.
Figure 20:
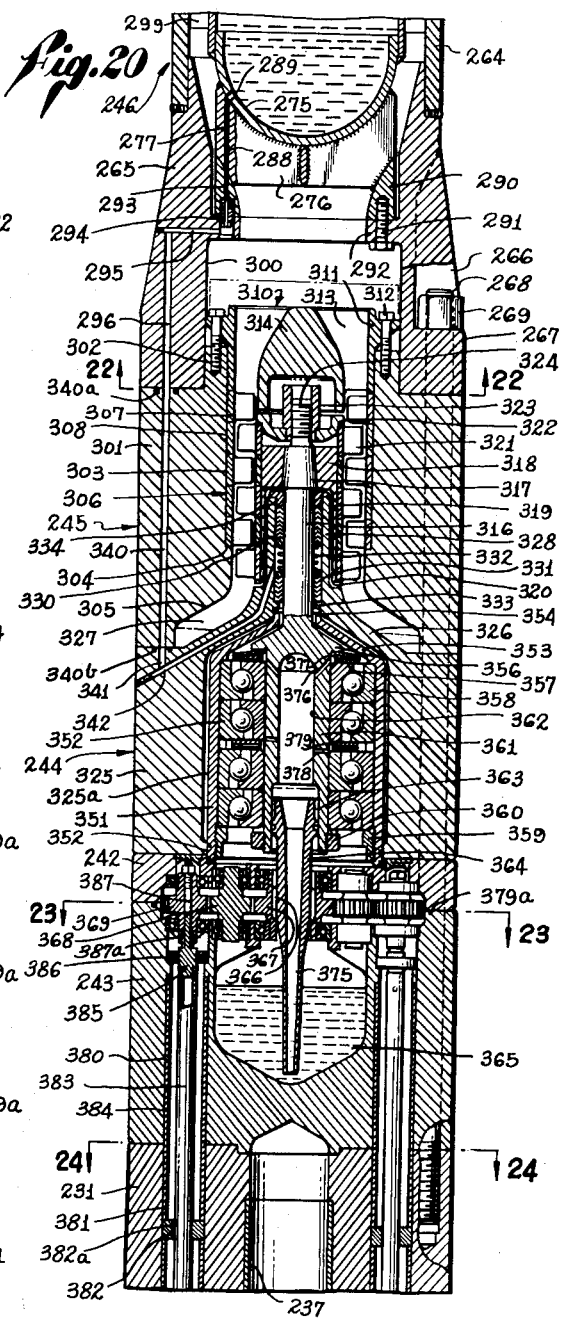
Fig. 20 is a vertical medial section of a portion of the drill below that of Fig. 19, being taken on section line 20—20 of Fig. 23.
Figure 43:
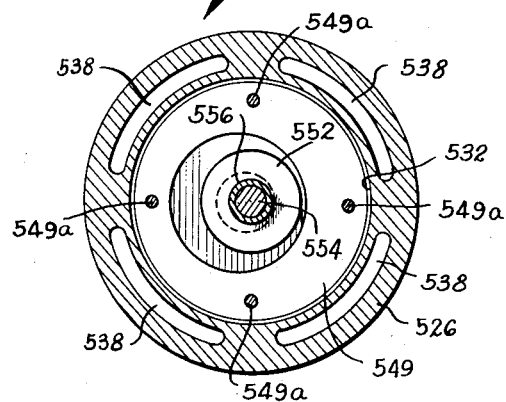
Fig. 43 is a section taken on line 43—43 of Fig. 41.
Figure 44:
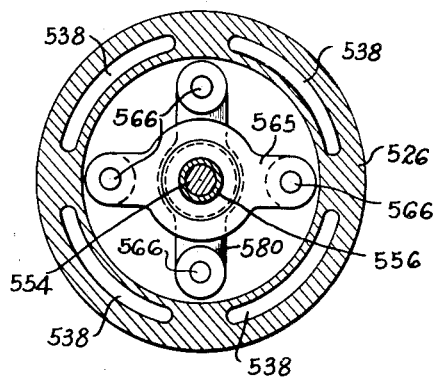
Fig. 44 is a section taken on line 44—44 of Fig. 41.
Figure 45:
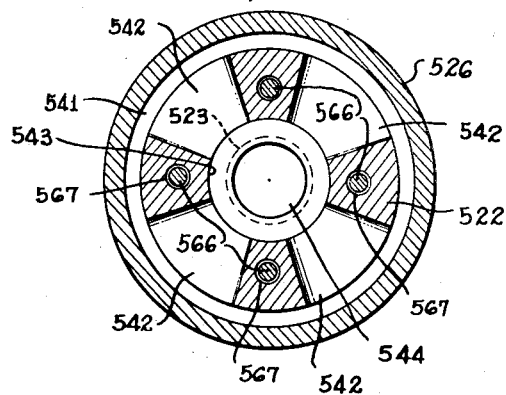
Fig. 45 is a section taken on line 45—45 of Fig. 41.
Figure 46:
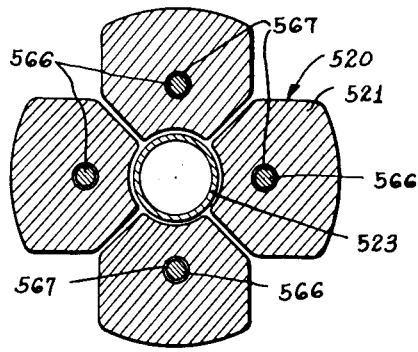
Fig. 46 is a section taken on line 46—46 of Fig. 42.

Considering now the oil cylinder unit 246, a substantial section of which has been broken away from Figs. 19 and 20, but whose true proportions are evident from Fig. 18, an exterior housing sleeve 264 is welded at the top to the aforementioned box 255, and is welded at the bottom to a fitting 265, which has an enlarging outside diameter in a downward direction, as shown in Figs. 18 and 20. The periphery of the fitting 265 is formed with a plurality of pockets 266 terminating at the lower end in flanges 267 to accommodate assembly studs 268 and nuts 269 employed to secure the head of the fork, the gear housing members 242 and 243, bearing unit 244, and the turbine unit 245, all to the fitting 265 on the lower end of the oil cylinder. As clearly shown in Fig. 20, the lower ends of the studs 268 are threaded into the upper end portion of the head structure 231 of the fork, the studs passing through suitable holes in the intervening units.

Returning to a consideration of the oil cylinder, the latter contains an inner reservoir cylinder 270, annularly spaced inside the housing sleeve 264 by a plurality of radially extending lugs 271, and open at the top for reception of a packed plunger 272. This plunger 272 is preferably equipped with an upwardly extending stem 273 which engages, when the cylinder 270 is full of oil, the lower end of a stop pin 274 depending from strainer bottom 258a. This provision is simply to assure that the cylinder 270 will not be overfilled with oil.

The lower end of oil cylinder 270 is closed by a hemispheric bottom wall 275. To the latter is welded a cross 276 (see Figs. 20 and 22), one wing of which has a thickened edge portion 277 formed with a vertical oil passage 288 which receives oil from the reservoir above by way of oil hole 289 in wall 275. Cross 276 is welded at the bottom to a ring 290 seating on and secured by screws 291 to a flange 292 formed inside the member 265, as clearly appears in Fig. 20. Oil passage 288 communicates at the bottom with oil passage 293 in ring 290. A sleeve 294 seated in and extending between ring 290 and flange 292, and equipped with suitable seals, establishes communication from passage 293 to an oil passage 295 in the member 265, and the latter is continued downwardly through the lower end of the member 265 by way of a passage 296, to communicate with a later described oil passage in the turbine unit 245.

As will be seen from Figs. 19 and 20, the mud fluid channel 259 within the strainer unit is continued downwardly through a suitable passage 298 in a coupling member 253 leading to an annular mud fluid channel 299 provided between the oil reservoir housing 264 and the inner oil cylinder 270. At the lower end of this channel 299 the mud fluid flows inwardly inside the hollow fitting 265, between the wings of the cross 276, and downwardly through ring 290 and flange 292 to the upper end of bore 300 formed in the lower portion of the member 265.

The lower end of the member 265 abuts the upper end of an upper turbine unit body 301, which is formed at the top with an extension 302, snugly received inside the bore 300. Member 301 is formed with a central bore 303 extending downwardly from the upper end of extension 302, and this bore 303 is reduced to form a shoulder at 304, and below shoulder 304, merges with a flared surface 305 cooperating with a later described formation to form a diverging mud fluid discharge channel.

The turbine, generally designated by numeral 306, is mounted in this bore 303, the bladed turbine stators 307, spaced by spacer rings 308, being received in the bore 300 and supported at the bottom by shoulder 304. A tubular retainer 310 is connected to the upper end of extension 302 by means of flange 311 and screws 312, and is formed with radial vanes 313 supporting a streamlined distribution head 314 designed to divide and direct the downwardly flowing mud fluid to the region of the turbine blades.

The turbine rotor has shaft 316 formed near its upper end with a tapered section 317 on which is tightly mounted a turbine rotor head 318 provided with a downwardly extending sleeve portion 319 formed with an outwardly extending flange 320 at its lower end. Mounted on this sleeve 319 and supported by the flange 320 are the bladed turbine rotors 321. A cap 322 engages the top rotor and the parts are held in assembly by means of a nut 323 screwed down tightly onto the threaded upper extremity 324 of the turbine shaft.

The turbine unit 245 includes a second body 325 engaging the lower end of the aforementioned body 301, formed with a central cavity 325a for a presently described turbine shaft bearing unit, and at the top with a conical wall 326 spaced from the flared surface 305 to provide diverging mud fluid discharge channel 327. This conical wall 326 is formed with an integral vertically extending tubular member 328 annularly spaced inside the rotor sleeve 319, and annularly spaced from turbine shaft 316 to provide a space for turbine shaft packing, preferably comprising upper and lower packing units 330 and 331 separated and pressed outwardly by an intervening spring 332. The lower packing is confined at the bottom by a flange 333 formed inside the member 328 and the upper packing 330 is confined by a retainer ring 334 screwed into the upper end of member 328.

An oil passage 340 extends downwardly through turbine body 301 from the passage 296 above, the juncture being sealed as at 340a, and communicates at the bottom with an oil passage 341 in the member 325, a seal being used as at 340b. The passage 341 intersects an upwardly extending passage 342 which opens through the inside surface of member 328 to the region between the two packing units 330 and 331. The packing is thus forced both directions from the center to make a good seal, and is supplied with lubricant from the center. The upper portion of the packing handles abrasive drill fluid, with no adverse pressure differential; and the lower portion handles the large pressure differential, but without abrasive fluid.

The aforementioned central cavity 325a in the body 325 opens downwardly through the latter, and received upwardly therein is a tubular shaft bearing housing 351, fluid sealed within the body 325 at its lower end, as indicated at 352, and formed at its top end with an inwardly inclined wall portion 353 terminating at the top in an upward projection 354 snugly received within a suitable counterbore formed centrally in the conical wall member 326 for purpose of proper alignment of the bearing housing at the top. Just below the top wall 353 of the bearing housing, the turbine shaft is formed with a collar or flange 356 which engages downwardly against a washer 357 supported by the inner race ring of the uppermost of a stack of bearings 358, the lowermost being retained by a retainer ring 359 screwed into the lower end of housing 351 and by a retaining ring 360 screwed onto the lower end of an enlarged tubular section 361 of the turbine shaft extending downwardly below the flange 356.

The turbine shaft section 361 is formed with a bore 362 extending downwardly from the level of collar 356, and has an enlarged lower end portion formed with splines 363. A tubular stem 364 is received at its upper end within the lower end of shaft section 361 and is formed with splines to engage the internal splines 363, so as to be rotated by the turbine shaft. The lower end of this tubular stem 364 extends downwardly into an oil reservoir 365 formed in the body 243, and an intermediate portion of the stem 364 has a splined connection at 366 with the inside of a spur gear 367. The stem 364 is also supported by the gear 367, as clearly shown in Fig. 20. Gear 367 meshes with four idler gears 368, which in turn mesh with four vibrator drive gears 369 located in vertical alignment with the four legs of the fork structure below (see Fig. 23). The gears 367, 368 and 369 are formed with upper and lower trunnions, the upper of which are furnished with suitable bearings supported in the plate 242 and the lower of which are provided with suitable bearings set into the upper end portion of the body 243, all as clearly shown in Fig. 20.

The tubular stem 364 is formed with a tapered oil passage 375, and when the turbine shaft rotates, oil climbs in this tubular passage 375 and is supplied to the hollow interior 362 of the turbine shaft section 361. The latter is furnished near the top with drilled holes 376 supplying this oil in back of the washer 357, and the latter is drilled, as at 377, whereby oil is delivered by centrifugal force through these passages to the bearings. Additional drilled holes 378 in the shaft and drilled washers 379 at a lower level similarly supply oil to the lower bearings of the stack. Gears 367, 368 and 369 and their bearings are lubricated with oil draining from the shaft bearings in its return path to the reservoir 365, which is sealed in by a rubber seal ring 379a fitted into a suitable groove in the upper face of the plate 242 (Fig. 23).

The body 243 and fork structure 230 are provided with aligned bores 380 and 381, respectively, in alignment with each of the aforementioned gears 369, the bores 381 extending down through the four legs 232 of the fork structure. At suitable intervals within this bore are bearings 382 for tubular drive shafts 383, the bearings 382 being spaced by long spacer tubes 384. Lubricating oil is filled in the space around the shafts 383, and the bearings 382 are grooved, as indicated at 382a in Fig. 20, for passage of this oil.

The upper ends of the tubular drive shafts 383 are furnished with solid shaft end members 385, provided with suitable bearings 386, and furnished with reduced extremities 387 passing through the gears 369 and splined thereto as at 387a. The tubular shafts 383 are furnished at their lower ends with fittings 383a having splined connections at 383b with the upper end portions of vibrator drive shafts 388.

The housing 389 of each vibrator 238 is longitudinally split into two halves, and bolted together as at 389a. At the upper end, it is connected to the lower end of the corresponding fork leg by high-strength screws 389b (Fig. 28) accommodated by small pocket and flange formations 390 and 390a on the lower end of the leg. The drive shaft 386 of vibrator (see Fig. 21) is supported in bearings received in a bore 391 extending downwardly into the vibrator housing and secured in position by suitable spacers and a threaded retainer 392 screwed into the upper end of the bore 391, the head end of the latter being recessed into the lower end of the fork leg as shown.

An oil seal 393 is provided inside the retainer 392 around the shaft 386 to prevent the column of lubricating oil above from leaking down inside the vibrator housing.

On the lower end of shaft 388, inside housing 389, is a bevel gear 395 meshing with two bevel gears 396 integral with two spur gears 397 and mounted for rotation in opposite directions on suitable bearings on a shaft 398 set into the vibrator housing. The gears 397 mesh with spur gears 399 integral with larger spur gears 399a and mounted for rotation in opposite directions on a shaft 400 mounted below shaft 398. The two gears 399a mesh with spur gears 401 on the periphery of two unbalanced vibrator rotors 402 mounted side by side, for rotation in opposite directions, on a common shaft 403 set into the housing. The two rotors are spaced by means of a hardened steel washer 404, as indicated. There are four such pairs of rotors 402, arranged vertically one above the other, with the gears 401 thereof in mesh from rotor to rotor. Lubrication of these parts is accomplished by introducing a few cubic centimeters of oil to the interior of the vibrator housing.

Figure 21:
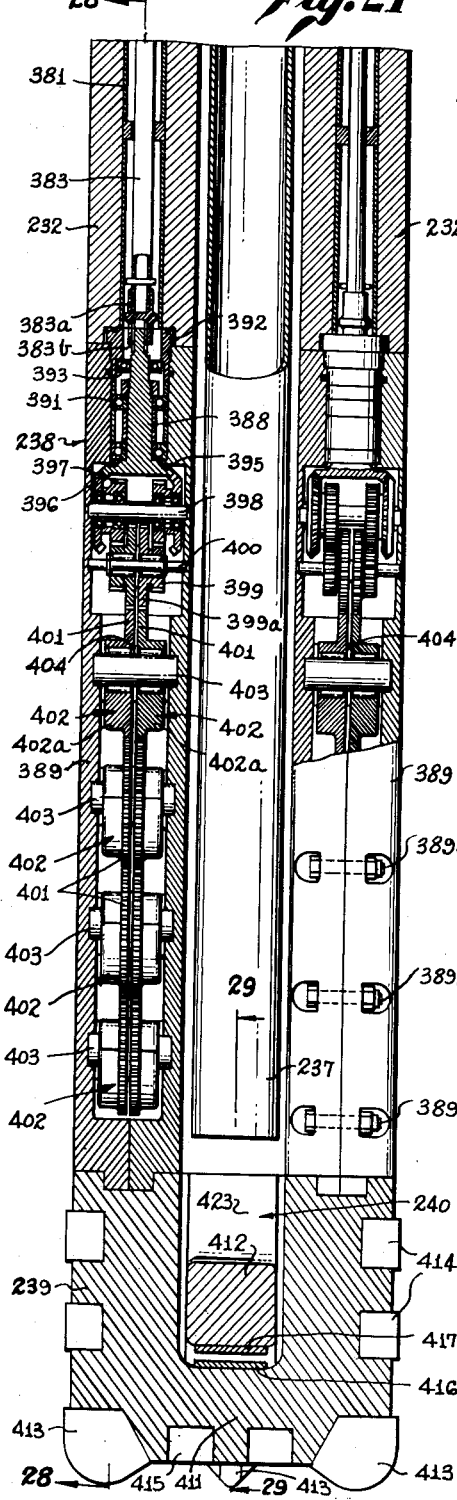
Fig. 21 is a medial sectional view of the lower portion of the drill, being taken in the same plane as Fig. 20.

The eccentric weights 402a of all rotors of each vibrator are arranged to move vertically in unison. It will also be seen that the two rotors of each pair turn in opposite directions, so that lateral components of vibration are balanced out. Vertical components of all rotors of each vibrator are thus in phase and therefore additive. Also, as indicated in Fig. 21, the vibrator rotors of the two vibrators connected to diametrically opposite legs all move vertically in unison. However, the vibrator rotors of the vibrators connected to the remaining two diametrically opposed legs, while synchronized with one another to move up and down in unison, move vertically at 180° phase difference from the rotors of the other pair of vibrators (see Fig. 29). Accordingly, when the vibrators are all in operation, those connected to one pair of diametrically opposed legs exert vertically directed in-phase alternating forces on the lower ends of those legs, whereas the vibrators connected to the other pair of diametrically opposed legs exert on the lower ends of the latter vertically directed alternating forces which are in phase with one another but which are 180° out of phase with the synchronized forces exerted on the first two legs. The elastic bar system is thus completely counterbalancing, even when driven at a frequency which is substantially off-resonance. This gives maximum quietness at the upper attachment, thus greatly facilitating the attachment of weight biasing drill collars above.

Figure 28:
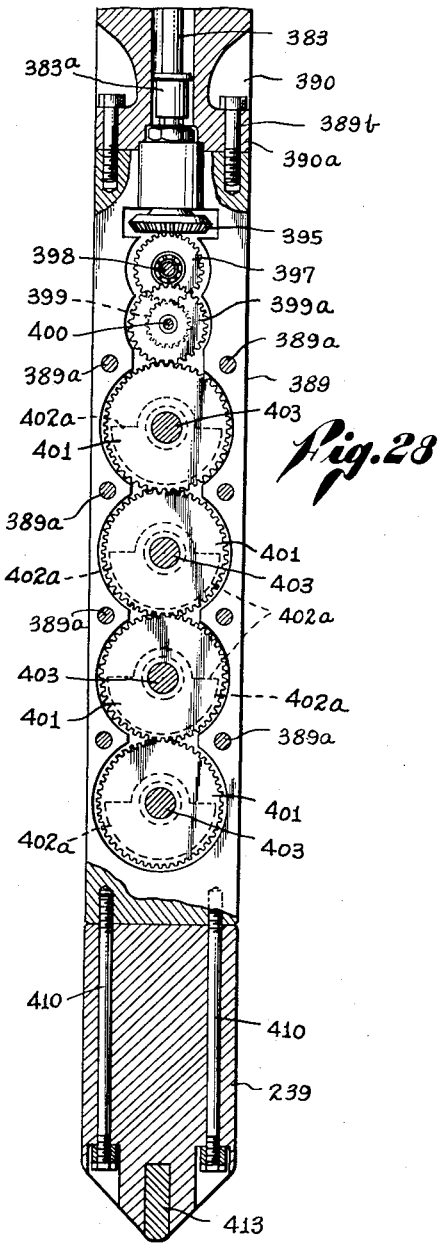
Fig. 28 is a section taken on line 28—28 of Fig. 21.

The bit members 239 and 240 are secured to the lower ends of the vibrator housings, for example by screws 410 as seen in Fig. 28. Referring to Fig. 21, it will be seen that the bit member 239 is U-shaped in cross section and includes a cross or bridge portion 411 which rigidly interconnects the lower ends of two diametrically opposite legs of the fork structure. The bit member 240, on the other hand, is generally H-shaped in cross section, including a cross or bridge portion 412 bridging over the portion 411 of the other bit member 239, with adequate vertical spacing therebetween, as shown in Figs. 21 and 29. The bit members 239 and 240 are furnished with suitable hardened insert cutter elements such as indicated at 413, 414 and 415. Attention being directed to Figs. 21 and 29, the cross portions 411 and 412 move alternately toward and away from one another in the vibratory operation of the drill, and steel bumper plates 416 and 417 are preferably used on said parts to take the impact. The engagement of these plates will be seen to limit the amplitude of vibration of the legs of the fork structure and thus to furnish a means for guarding against overstressing of the leg structures under any extreme conditions of vibration.

In the operation of the drill, mud fluid received downwardly from the drill stem, strained at strainer sleeve 258, and caused to flow downwardly through the turbine, drives the turbine rotor and turbine drive shaft. The mud fluid received from the turbine flows through channel 327 to a plurality of mud fluid passages 420 (Fig. 27) extending downwardly through turbine bearing unit 325, plate 242, and oil reservoir unit 243, in the lower portion of which said passageways converge and join one another to form a single outlet 421. The latter discharges to a port 422 in the upper end of the head 231 of the fork structure, and thence to the previously mentioned mud fluid discharge pipe 237, which is set into a bore in the head of the fork structure as shown. The mud fluid is finally discharged from the lower end of pipe 237 to the space 423 between the bit elements, and thence discharged to the well hole.

The turbine drive shaft drives stem 364 and thus the main drive gear 367, and the latter, through idler gears 368, drives the four spur gears 369 which drive the four transmission shafts 383 extending downwardly in the four legs of the fork structure to the shafts of the corresponding vibrators 238.

Accordingly, the four vibrators are simultaneously driven from the turbine, and, as earlier described, the vibrators of two diametrically opposite legs exert in-phase vertically directed alternating forces on the lower ends of those legs, while the vibrators connected to the remaining two legs exert vertically directed in-phase alternating forces on said legs as regards said second pair, but the latter forces are 180° out of phase with reference to the forces exerted on the first two legs. This phase relationship is accomplished in the initial positioning of the rotors with reference to their respective driving gears. For example, all rotors in two diametrically opposed legs can be set up to be initially in their lowermost positions, while all rotors in the remaining two vibrators must then be initially set in their uppermost positions. The several vibrators will then be in the desired phase relationship which has been described.

As with the earlier described embodiments of the invention, the legs of the fork structure can vibrate longitudinally as quarter wave-length fixed-free bars. In the arrangement described, the two legs of each diametrically opposed pair, subjected to the alternating force impulses received from the vibrators connected directly thereto, vibrate longitudinally in unison with one another. Each pair of diametrically opposed legs, however, will be seen to vibrate at 180° phase difference from the other. The result is that the structure is in dynamic balance, the head portion of the fork, which is the location of a stress antinode, standing substantially stationary, while the two pairs of diametrically opposite legs alternately elastically elongate and contract at 180° phase difference from one another. The device is an essentially quarter wave-length device, with velocity antinodes at the lower ends of the legs and a stress antinode at the head structure. The bit members 239 and 240 connected to the two diametrically opposite legs of each pair will be seen to be moved alternately against the formation, attacking it, generally speaking, in the manner hereinbefore described in connection with earlier embodiments of the invention. Lateral components of vibration in the legs are prevented by tying diametrically opposed legs together by the bit members.

An alternative arrangement of the last described drill results from omitting the bits from one pair of diametrically opposed legs, though the legs should preferably still be cross tied to one another to restrain lateral vibration. The advantage in omitting the bit from one pair of legs is that these legs are then free of the damping that results from engagement with the work, and can hence vibrate at greater amplitude. The result is often the achievement of a system of higher "Q." It is also feasible to omit the vibrators in the two legs which carry the bit, as will be evident from explanations given hereinabove.

It can be seen that if the separate legs are not cross-connected at the bottom, and if the vibrators are geared with 90° phase difference, the four-phase mode of Fig. 9 will be accomplished.

Reference is next directed to Figs. 31 to 40, showing a form of the invention similar in many general respects, to that last described, provided with the same type of four-legged fork structures, and again powered by a mud fluid turbine, but wherein the vibrators for the several fork legs comprise vertically reciprocating shafts mounted in the legs. A fork structure 435 having head 436 and four individual legs 437 is provided, the latter carrying bit members 438 and 439, all similar in general respects to corresponding parts of the preceding embodiment.

A turbine housing 440 at the top has a box coupling 440a, to which may be coupled one or more drill collars suspended from the usual drill pipe through which the mud fluid is supplied. If desired, a mud fluid strainer unit, as well as lubrication provisions for the turbine, may be incorporated above the turbine housing, as in the earlier embodiment. Turbine housing 440 has bore 441 receiving turbine stators 442, and above the stators is sleeve 443 having vanes 444 supporting mud fluid distributor 445. Mounted on the upper end portion of turbine shaft 446 is turbine rotor head 447 having sleeve 448 carrying the turbine rotors 449. At the lower end of turbine housing 440 is bearing housing body 450, provided with an upwardly extending packing sleeve 451 carrying suitable packing 452 for the turbine shaft. Received in a cavity 455 extending upwardly into bearing housing body 450 from the bottom is a bearing housing 456, and supported in the latter are a plurality of bearing plates 457, the latter being keyed to the housing against rotation as indicated at 458, and vertically spaced by spacers 457a. Intervening between the bearing plates 457 are bearing plates 459 keyed onto the turbine shaft 446, as indicated at 460, and spaced by spacers 461. Any suitable means, not shown, may be provided for the purpose of lubricating these bearing plates.

Between the lower end of body 450 and the upper end of head 436 is a gear housing body 465 having a cavity 466 at the top. It may be mentioned at this time that the turbine housing 440, bearing housing body 450, gear housing 465 and the head 436 of the fork structure are assembled by any suitable means, here indicated in the form of long studs 467 (Figs. 31 and 39) extending upwardly from the crotch 468 between legs 437 through suitable drill holes in the members 436, 465 and 450 and threaded at the top in sockets formed in the lower end portion of the turbine housing, as indicated at 469, nuts 470 being threaded onto the lower ends of the studs, as shown best in Fig. 39. Fig. 39 also shows mud fluid passages 471 extending downwardly through members 450 and 465 to establish communication between the discharge end of the mud turbines and the mud discharge pipe 471a carried by the head 436 of the fork.

Secured to and extending downwardly from the lower end of the turbine shaft 446, and acommodated within the cavity 466 in housing member 465, is a sleeve formed with a spur gear 472, and this gear meshes with four idler gears 473, which in turn mesh with four spur gears 474 tightly mounted on the upper ends of shafts 475 extending downwardly through aligned drill holes 476 and 477 in the housing 465 and fork structure, it being understood that the holes 477 extend downwardly through the four legs of the fork structure, as indicated in Fig. 33. The gears 473 are provided with spindles furnished with bearings mounted in the body 465 at the bottom of cavity 466, and in a spider 479 above, the latter being understood to be supported from suitable posts 480 (Fig. 36) understood to extend upwardly from body 465.

In the illustrative embodiment, the shaft 475 is in two parts, a central rod 481, and a surrounding sleeve 482, the latter being press-fitted at the top onto an enlarged upper end portion of the rod 481, as clearly seen in Fig. 32. At the bottom, the rod has an enlarged portion 483 extending below the lower end of sleeve 482, but the two members are free of one another at this point, for a purpose to appear presently.

The gear 474 is press-fitted onto the upper end portion of rod 481 and has a sleeve furnished with a slide bearing 484 carried by spider 479. The sleeve 482 is provided with a suitable number of slide bearings, such as indicated at 485 in Figs. 32 and 33.

Between the lower ends of each of the fork legs 437 and the bit members are devices 490 designed to effect reciprocation of the rod 481 and sleeve 482 upon rotation of the latter, and by reference to Fig. 32 it will be seen that the gear 473 is made sufficiently thick to accommodate limited reciprocation of the members 481 and 482 without interfering with the driving engagement between gears 473 and 474. In other words, the gear 474 reciprocates vertically with respect to gear 473 while being driven by the latter.

In the present exemplification, the devices 490 for accomplishing this reciprocation of the shaft members 481 and 482 are swash plate mechanisms, now to be described. Housing bodies 491, 492 and 493 for these mechanisms are interposed between the lower end of each fork leg and the bit, being secured in assembly with the fork leg by long screws 494 extending through the bit, the three members 491, 492 and 493, and threaded into the lower end of the leg 437, as indicated in Fig. 31. The bore 477 in the leg 437 extends through the members 491 and 492 and part way through the member 493, as shown in Fig. 33. A bearing bushing 495 set into member 492 furnishes slide bearing for the lower end portion sleeve 482, and also slide bearing for the upper portion of the enlarged lower end portion 483 of rod 481. The lower end portion of member 483 is provided with a slide bearing 496.

Between the housing members 491 and 492 is formed a spherical cavity 497, having its center close to but horizontally offset from the axis of the rod 481 and sleeve 482, as clearly seen in Fig. 33; and between the members 492 and 493 is a second spherical cavity 498, with its center similarly horizontally offset from the axis of the rod and sleeve.

In each of the two spherical cavities are two spaced spherical segments 500, in sliding engagement with opposite faces of a swash plate 501, the upper swash plate being mounted tightly on the sleeve 482, and the lower one on the lower end portion 483 of rod 481. The segments 500 are formed with suitable apertures, as indicated at 502, to give clearance for the rod 481 and sleeve 482 throughout the presently described circular rocking of spherical segments 500 and the rotating movement of the rod 481 and sleeve 482.

As the rod 481 and sleeve 482 rotate as a unit, the swash plates cause a circular rocking or nodding motion of each of the pairs of spherical segments 500. The segments 500 do not spin on the axis of the rod and sleeve, being prevented from so doing by reason of the fact that their center is not on that axis. Also because of the offset distance between the axis of the rod and sleeve, on the one hand, and the center of the spherical cavities and segments 500 on the other, the spherical segments, in undergoing the described circular rocking motion, impart a vertical reciprocation to the rod 481 and sleeve 482 relative to the fork legs. It will be evident that the amplitude of this vertical reciprocation is equal to twice the horizontal offset distance between the center of the spherical cavity and segments 500 and the axis of the rod and sleeve divided by the tangent of the angle between swash plate and the axis of the rod 481 and sleeve 482.

The characteristic operation, then, is that the rod 481 and sleeve 482 are bodily reciprocated through a fixed vertical amplitude by the swash plate mechanism, one complete cycle of reciprocation occurring for each revolution of the rod and sleeve, it being noted that such reciprocation is permitted at the top end by sliding action of the gear 474 on the driving gear 473. It would theoretically be possible to use a simple single-part shaft or tube in place of the rod 481 and sleeve 482, but the described arrangement is superior in practice because of difficulty which would otherwise be encountered in causing the two swash plate mechanisms to divide the load between them. In the illustrated arrangement, slight inaccuracies in manufacture are taken up by reason of the elastic property of the rod 481 and sleeve 482. It will be seen, therefore, that the rod 481 and sleeve 482 are caused to undergo one cycle of vertical reciprocation for each revolution. Considering the members 481 and 482 now as inertia weights, broadly equivalent to the unbalanced rotors of the previous embodiment, the vertical reciprocation of these members sets up corresponding vertical reaction forces between the swash plates thereon and the pairs of spherical segments 500 causing such reciprocation, and it will be seen that these reactive forces are borne by the corresponding spherical bearing faces on the members 491, 492 and 493 connected to the lower ends of the fork legs. The reactive forces resulting from reciprocation of the rod and sleeve assemblies 481, 482 are accordingly exerted against the lower ends of the fork legs.

It is, of course, to be understood that one such reciprocating shaft member or assembly and swash plate mechanism is arranged in each of the four legs of the fork structure. The swash plate mechanisms in the two diametrically opposed legs seen in Fig. 33 are synchronized with one another, as clearly appears; and it is to be understood that the swash plate mechanisms in the two remaining legs are synchronized with one another in like manner, but are arranged at 180° from those in the first mentioned legs. Accordingly, the alternating forces exerted on the members of each pair of diametrically opposed legs are in synchronization, causing such legs to vibrate together, while the forces on the other two legs are also synchronized with each other, but at 180° phase difference from the first mentioned legs. Thus, while the two legs of the second pair vibrate together, they vibrate at 180° phase difference from the first pair. The result is a balancing of force at the head structure of the fork, which remains stationary, as in the earlier described forms of the invention.

It will be seen that the essential performance of the embodiment of Figs. 31 to 40 is like that of the immediately preceding embodiment, the distinguishing characteristic of the last described embodiment being that the reciprocating inertia members in the several legs of the fork structure extend the full length of the legs.

Reference is next directed to the embodiment shown in Figs. 41 to 46, inclusive, which in general respects, particularly with regard to the four-legged fork structure and the turbine drive, is similar to the immediately preceding embodiment. The present embodiment is characterized by location of the reciprocating inertia members above the head of the fork structure, with push-pull rods extending therefrom downwardly through the several legs of the fork and connected to the fork legs near the lower ends of the latter serving to transmit the reciprocating forces to the main fork structure of the drill.

With reference to Figs. 41–46, numeral 520 designates a fork structure having four symmetrical legs 521 extending downwardly from the head structure 522, a central pipe 523 being set into the head structure to receive the mud fluid and discharge it at the location of the bit, while the numerals 524 and 525 designate generally bit members of the type described in detail in connection with the preceding embodiment. A cylindrical housing 526 is joined at its lower end to head structure 522, and at its upper end to a body 527 containing housing 528 for turbine shaft bearings 529 and 530, generally of similar nature to corresponding parts found in Fig. 32. The body 527 may be regarded as continuing upwardly generally in the manner shown in Fig. 32 to be joined in a suitable manner to a turbine unit similar, for example, to that shown in Fig. 32.

The housing 526 has a cylindrical cavity 532, formed at the top with a head wall or flange 533 abutting the lower end of body 527 inside the coupling flange of the latter, and formed with a central opening 534. The side walls of the housing 526 are relatively thick to accommodate mud fluid passages 538, which communicate at the top with mud fluid passages 539 corresponding to the passages 471 of Fig. 39 and understood to lead from the discharge outlet of the turbine located above. Near the lower end of the housing 526, its wall thickness is reduced, providing a shoulder at 539 which seats on the upper end portion 540 of the head structure 522 of the fork. The lower ends of the mud fluid passages 538 will be seen to discharge to annular space 541 between the reduced lower end portion of housing 526 and the reduced upper end portion 540 of the head of fork 522, and radial passages 542 convey the mud fluid from this annular space 541 inwardly to a cavity 543 which opens downwardly through port 544 to mud fluid discharge pipe 523.

The lower end portion of tubular turbine shaft 531 has internal splines 545, and meshing therewith is a gear 546 which drives a spring 547 connected at its lower end to the uppermost of two rotary and longitudinally reciprocating inertia members 548 and 549. Each of these inertia members comprises a relatively heavy body formed in two parts and connected by screws 549a, and between the two parts of each such body is formed a spherical cavity 550, located on a vertical axis offset horizontally from the vertical axis of the turbine shaft.

In each of the spherical cavities 550 is a pair of spherical segments 551, bearing on a swash plate 552. The swash plate 552 in the uppermost of the two inertia units is tightly mounted on an enlarged upper section 553 of a vertical reciprocating push rod 554, while the swash plate 552 in the lowermost of the inertia units is shown as integrally formed on a push sleeve 556 slidingly mounted on the aforementioned push rod 554.

The inertia members 549 and 549 are formed with vertical central bores 558, which are equipped with bearing bushings 559 for the rod member 553 and the tube member 556. To accommodate conveniently the drive spring 547, such spring is preferably extended down into this bore 558, and its lower end is secured to the bottom of a cup member 560 received in the upper end portion of said bore 558, the cup being secured as shown to the upper end of member 548. It will be seen that the member 548 is rotated through the spring 547 from the turbine shaft 531. To transmit this rotation to the second inertia member 549, studs 561 are set into the upper end of the latter and are slidably received in sockets 562 formed in the lower end of inertia member 548. The two inertia members 548 and 549 are thus drivingly interconnected to permit a degree of vertical reciprocation toward and from one another without breaking their rotary interconnection and without interference with one another. It will further be seen that rotation of the members 548 and 549 acts through the spherical segments 551 and swash plates 552 so as to tend to impart relative vertical reciprocation to the rod and sleeve members 554 and 556. The swash plate action is generally equivalent to but the reverse of that found in the immediately preceding embodiment. It will be observed that the swash plates are at opposite angles to one another, or in other words, have a phase relation of 180°, with the result that the reciprocation or rod 554 and sleeve 556 takes place at 180° phase difference.

Mounted on the lower end of tube 556 is a cross-head 565 having arms aligned with two of the legs 521 of the fork, and connected to these arms of cross-head 565 are two long shafts 566 reaching downwardly through bores 567 extending vertically through the head structure 522 and the legs 521 to the lower ends of the latter. Bearing bushings 568 for the shafts 566 are mounted in the bore 567 at suitable intervals. The lower ends of the rods 566 are connected to the lower ends of the legs 521, and as here shown, they are furnished at their lowermost ends with heads 570 engaging taper rings 571 entered into the flared lower ends 572 of the bores 567, plugs 573 screwed into the counterbores 574 at the bottom being set up tightly against the heads 570 to assure a rigid connection. The plugs 574 are preferably furnished with oil seals as indicated at 575.

In similar manner, the lower end of the rod 554 is furnished with a cross-head 580, to the two arms of which are connected similar long rods 566 reaching downwardly through the head structure of the fork and through the two remaining diametrically opposite fork legs 521, it being understood that the last-mentioned rods 566 are connected to the lower ends of their respective fork legs in the same manner as shown in Fig. 42.

In operation, the turbine shaft rotates the inertia members 548 and 549, which causes rotation of the spherical segments 551 on the common vertical spin axis of the turbine shaft, which is also the vertical axis of rod 554 and tube 556, the interaction of the segments 551 with the swash plates on rod 554 and tube 556 producing a circular nodding or rocking action of said segments about the centers of the spherical cavities in addition to their rotation about the spin axis. The swash plates themselves are, of course, in this instance, held against rotation. Now, if the centers of the pairs of spherical segments were located on the spin axis, the segments could undergo their nodding or rocking motion as they moved about the swash plates without also undergoing relative vertical movement with respect to the swash plates. But with the centers of the segments offset from the spin axis, there must be relative vertical oscillatory movement between the swash plates and the respective pairs of segments, for reasons given in describing the preceding embodiment. Accordingly, vertical reciprocating forces, due to vertically vibrating the masses 548 and 549, are exerted between pairs of spherical segments and the respective swash plates, and it will be seen, from the opposite angles of the swash plates, that the forces at the two swash plates have 180° phase difference. Alternating vertically directed forces, of 180° phase difference, are accordingly exerted on the upper portions of rod 554 and tube 556, and these are transmitted, in the case of tube 556, downwardly through cross-head 565 to one pair of rods 566 extending through two diametrically opposite legs of the fork to the lower ends of said legs, and in the case of rod 554, downwardly through cross-head 580 and another pair of rods 566 downward through the remaining pair of fork legs to the lower end thereof. The 180° opposed alternating forces are thus exerted on the lower end portions of the two pairs of diametrically opposite legs 521.

The over-all or external behavior of the drill of Figs. 41 to 46 is the same as that of the preceding embodiments, the essential difference being simply that in the case of the present embodiment, the inertia members are located conveniently above the head of the fork structure, and are operatively connected by long rods to the lower end portions of the fork legs, where the latter can be most easily set into the necessary vibratory action.

Figs. 47–49 show another embodiment of my new drill, with a much simplified form of fluid powered oscillator. In this instance, the fork comprises an outside tube 600, constituting one "leg" of the fork structure, furnished at the lower end with bit elements 601, and an inside or center leg generally designated by the numeral 602 and embodying a combination fluid driven motor and vibrator. The leg 602 carries a bit element 603, shown in this instance as elevated somewhat below bit elements 601, though the element 603 may be on the same elevation with 601, if desired. Moreover, either one of the bit members may be eliminated.

As shown, the aforementioned outside tube 600 is tightly fitted to a head structure 604 of the fork, and this head structure is shown to be provided with internally threaded coupling box 605 for coupling to the drill stem above, the latter preferably and usually including one or more conventional drill collars between the drill pipe and the drill proper in order to furnish substantial weight on the bottom. Depending from the head structure 604 is a shank 606, and a mud fluid circulation passage 606a extends downwardly through this shank, being understood to receive drilling mud fluid from the drilling string above. Near its lower end, the shank 606 is cut away to its medial longitudinal plane, and a slab 607 is fastened to the cut away portion 606b of the shank as by bolts 608, as shown in Fig. 49. A vertical series of pockets or cavities 610 of circular periphery are formed between the portion 606b of the shank and the removable slab 607, the uppermost of these pockets being interconnected with the fluid passageway 607 by a passageway 611 which joins the cavity 610 at the top and in a tangential direction. The cavities 610 join and open into one another, as shown, and the lowermost has a tangential outlet 614 leading to mud fluid discharge port 615 in bit member 603.

Horizontal center pins or axles 616 are mounted in the shank portion 606a and slab 607 on the central axes of the cavities 610, and are surrounded by inertia rings 617. The latter have bores 618 of diameters approximately twice that of the axles 616, and when riding on the axle 616, the outer periphery of the inertia ring has a small clearance with the periphery of the cavity 610, as shown. Preferably, the axles 616 are crowned, as clearly shown in Fig. 49.

The inertia rings 617 are caused to rotate on their axles 616 by the mud stream delivered from the passageway 611 and circulated successively through the pockets 610 on its way to final discharge at the bottom. As indicated by the arrows in Fig. 48, the mud fluid enters tangentially at the top and circulates around the periphery of the chamber 610. At the bottom of the chamber 610 some of the mud fluid continues around the chamber, while some is diverted downwardly by the deflector formation at 619 so as to enter the second chamber 610 in a tangential direction. It is to be noted that the direction of circulation within the second chamber is opposite to that within the first and this alternation continues downwardly from chamber to chamber as will be seen. Thus, in each of the chambers 610, mud fluid circulates in a circular direction, a certain given amount of mud entering constantly at the top, and a like amount being discharged at the bottom into the chamber immediately below.

The mud fluid circulating in the chambers 610, as described, causes the inertia rings 617 to spin or turn on the axles 616, Fig. 48 showing two successive positions of said rings in this action. The centrifugal forces exerted by the spinning rings on the axles 616 is relied on for the desired vibration of the center leg of the fork. In general, mud flow through the chambers 610 will cause the described rotation of the several inertia rings, but without frequency control, the phase relations between individual rings will be at random. However, when the mud fluid is circulated through the system at such a flow rate as causes the rings to rotate at frequencies approximating the resonant frequency of the fork, the forces contributed by the rings become synchronized because of the uniform vibration of the several axles. The fork legs tend easily to vibrate longitudinally at their resonant frequency, and even without initial synchronism of the rings, they will shortly work into positions which will produce a small degree of such longitudinal resonant vibration. Once this starts, the rings are automatically synchronized by the movement of the fork, and in very short order, all of the rings move vertically in unison with one another, giving maximum vibration amplitude to the fork structure. Because successive rings are moving in opposite directions of rotation, their movements in the lateral direction are in opposition. Using an even number of rings, as in the illustrative embodiment, lateral forces are, accordingly, in balance and cancel one another. Accordingly, the device exerts an alternating force in the vertical direction on the lower end portion of the central leg 602 of the fork structure. For reasons explained in connection with earlier forms of the invention, the alternating force so exerted on the one leg 602 creates an alternating elongation and contraction of said leg at the resonant frequency of the fork, which action sets up a cyclic stress in the head structure 604 of the fork, creating, in turn, a sympathetic longitudinal elastic vibration of the outside leg 600, whereby the latter is caused to undergo corresponding longitudinal elastic vibration, but in opposite phase to the movement of the center leg 602.

Figure 50:
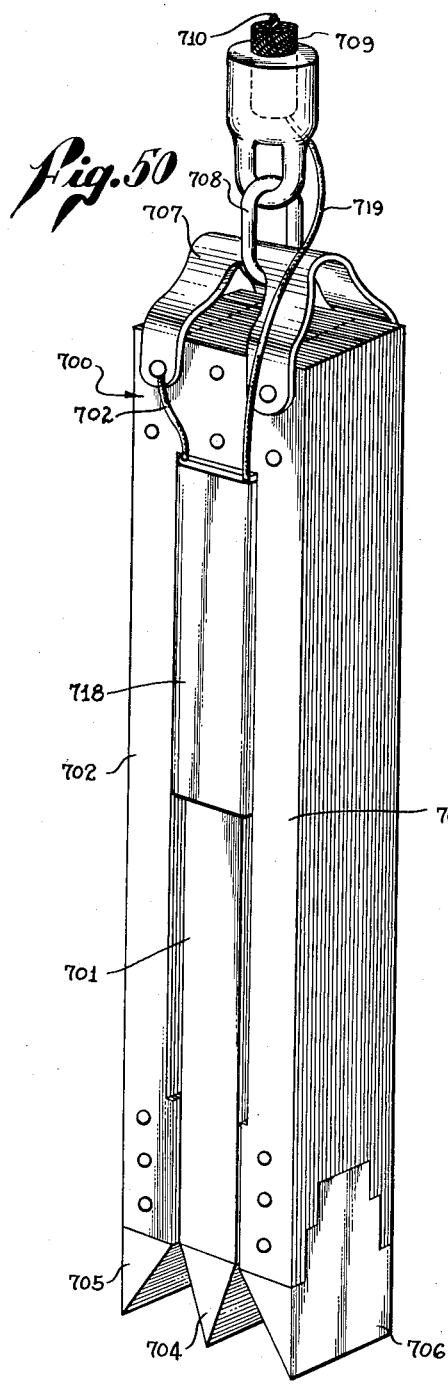
Fig. 50 is a perspective view of a further modification of the invention.
Figure 51:
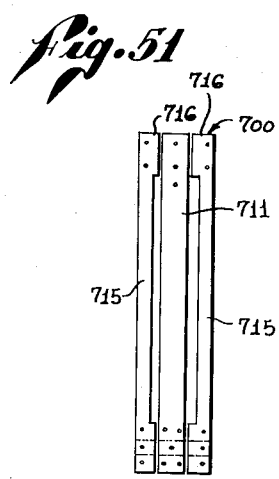
Figs. 51 and 52 are parallel longitudinal sections of the drill of Fig. 50, separated by one lamination layer, showing an illustrative laminating structure.
Figure 52:
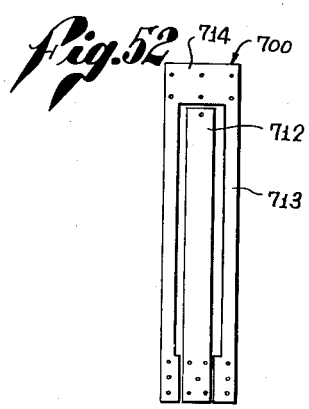

Figs. 50–52 show a further modified form of the invention, utilizing a magnetostrictive vibration generating means, and having a fork structure and cable suspension means of physical structure generally similar to that of Fig. 1. Thus, the fork structure has head 700, central leg 701, and outside legs 702 and 703, the total cross-sectional area of legs 702 and 703 taken together being equal to the cross-sectional area of leg 701. The legs 701, 702 and 703 have bits 704, 705 and 706, respectively, and the fork is illustratively suspended by means of bail 707, link 708, and cable 709 understood to house insulated conductor 710.

The legs are formed of laminations. In the illustrated embodiment, the inside leg is made up of alternating long laminations 711, extending up to form a part of head structure 700, and shorter laminations 712 terminating just below head structure 700. The outside legs are made up of U-shaped laminations 713 whose bridge portions 714 overlie the upper ends of short center leg laminations 712, alternating with leg members 715 whose upper end portions 716 abut the upper end portions of long center leg laminations 711, as clearly illustrated in Figs. 51 and 52.

The outer leg laminations may be fabricated of standard transformer lamination material, as silicon steel, and the center leg laminations are composed of magnetostrictive material, i.e., a suitable nickel alloy. A coil 718 is placed on center leg 701, and may be energized through suitable circuiting, here represented as a lead 719 connected to cable conductor 710, and another lead 720 grounded to the fork structure.

A suitable source of oscillating current at the ground surface is connected to the cable conductor 710. The current pulsations in coil 718 cause alternate elongations and contractions of leg 701, and by correlating the frequency of the current source with the resonant frequency of the leg 701, considered as a quarter wavelength bar, resonant longitudinal elastic vibration of the leg 701 is established. In accordance with principles heretofore set forth, this vibration of the center leg sets up sympathetic longitudinal vibrations of the two outside legs 702 and 703, but of 180° phase difference, so that the type of polyphase longitudinal leg vibration characteristic of the invention is again established.

An advantage of this form of the invention is that it lends itself to vibration in the higher frequency ranges, and can accordingly be made in correspondingly shorter lengths. This magnetostrictive drive type, like that of Fig. 1, accordingly has application to situations wherein a compact device is a necessity. It lends itself, in fact, to various drilling or cutting operations or the like in fields aside from earth boring.

I claim:

1. In a sonic earth boring drill, the combination of: a massive elastic fork structure comprising a head and a plurality of pairs of parallel laterally spaced elastic legs depending therefrom, each of said legs having coacting elastic stiffness and vibratory mass for giving the legs like resonant frequency for longitudinal elastic vibration thereof, a bit connected to the lower end of at least one of said legs, a vibrator drivingly connected to the lower portion of at least one leg of each of said pairs, and operable to apply thereto cyclic longitudinal vibration forces, and means for synchronously driving the vibrators of different pairs to operate at a predetermined symmetrical phase difference, at said resonant frequency.

2. In a sonic earth boring drill, the combination of: a massive elastic fork structure comprising a head and a plurality of pairs of parallel laterally spaced elastic legs depending therefrom, a bit connected to the lower end of at least one of said legs, a vibrator drivingly connected to the lower end of each of said legs, and operable to apply thereto cyclic longitudinal vibration forces, and means for synchronously driving the two vibrators of each of said pairs of legs to operate in phase, and the vibrators of different pairs to operate at a predetermined symmetrical phase difference, at a frequency for resonant longitudinal vibration of said legs.

3. In a sonic earth boring drill, the combination of: a massive elastic fork structure comprising a head and two pairs of parallel elastic legs depending therefrom, bit means connected to the lower ends of the legs of at least one of said pairs, vibrators drivingly connected to the lower end portions of the legs of the other of said pairs, and operable to apply thereto cyclic longitudinal vibration forces, and means for synchronously driving said vibrators in phase with one another at a frequency for resonant longitudinal vibration of said legs.

4. In a sonic earth boring drill, the combination of: a massive elastic fork structure comprising a head and a plurality of parallel elastic legs depending therefrom, a bit operatively connected to the lower end of at least one of said legs, a vibrator comprising an eccentrically balanced rotor means mounted on the lower end portion of at least one of said legs, a hydraulic turbine mounted above said head, and power transmission means between said turbine and vibrator including a rotatable shaft extending longitudinally of said leg on which said vibrator is mounted, said shaft being operatively connected to said turbine at the top, and to said vibrator at the bottom.

5. In a sonic earth boring drill, the combination of: a massive elastic fork structure comprising a head and parallel legs depending therefrom, a bit connected to the lower end of at least one of the legs, and a vibrator connected with the lower portion of at least one of the legs operable at a longitudinal resonant frequency of the legs, said vibrator comprising a vibrator shaft extending longitudinally along and arranged for both rotation and longitudinal reciprocation with respect to at least one of said legs, means for rotating said shaft and means acting between the lower end portion of said shaft and the lower end portion of said leg for causing said shaft to reciprocate upon being rotated with respect to said leg.

6. In a sonic earth boring drill, the combination of: a massive elastic fork structure comprising a head and a plurality of parallel elastic legs depending therefrom, a bit operatively connected to the lower end of at least one of said legs, a mass mounted above said head for rotation about a vertical axis and for vertical reciprocation, means for rotating said mass, push-and-pull force transmission means including a shaft extending longitudinally of at least one of said legs and operatively connected to the lower end portion of said leg, and means acting between said rotating mass and said force transmission means for causing said mass to tend to reciprocate and to exert a vertically directed alternating force on said transmission means by virtue of said rotation of said mass.

7. A polypole sonic drill comprising a plurality of substantially parallel elastic longitudinally vibratory rods of like resonant frequency, arranged with corresponding ends in close proximity, a bit on at least one of said rod ends, and means for setting said rods into longitudinal elastic vibration at said resonant frequency in symmetrical polyphase relationship to one another.

8. In combination: a plurality of parallel elastic longitudinal vibratory bars rigidly joined to one another at a common end, so as to form a unitary plural-legged structure, each bar having coacting elastic stiffness and vibratory mass for giving the bars like resonant frequency for longitudinal elastic vibration thereof, a working tool connected to the free end of at least one of said bars, and a vibrator having a fixed driving connection to a free end portion of at least one of said bars and operable to apply to said bar cyclic longitudinal vibration forces at said resonant frequency.

9. In combination: a pair of parallel elastic longitudinally vibrating bars of approximately equal length, rigidly joined to one another at a common end, each bar having coacting elastic stiffness and vibratory mass for giving the bars like resonant frequency for longitudinal elastic vibration thereof, a working tool connected to the free end of at least one of the bars, and a vibrator having a fixed driving connection to a free end portion of one of the bars, said vibrator being operable to apply to the bar to which it is connected cyclic longitudinal vibration forces at said resonant frequency, whereby to set up along said bar a resonant standing wave with a velocity antinode at the free end and a stress antinode at the end joined to the other bar of the pair, and whereby a similar standing wave is induced in said other bar, at 180° phase difference from the standing wave in the first mentioned bar.

10. In combination, a pair of parallel elastic longitudinally vibrating bars of approximately equal length, rigidly joined to one another at a common end, a working tool connected to the free end of at least one of the bars, and synchronized but oppositely phased vibrators having fixed driving connections to free end portions of the respective bars, said vibrators being operable to apply cyclic longitudinal vibration forces of 180° phase difference to the respective bars, at the frequency of resonant vibration thereof, whereby to set said bars into resonant standing wave vibration at 180° phase difference.

11. In combination, four parallel elastic bars rigidly joined at one common end to provide a fork structure, said bars being laterally spaced from one another and grouped about a central longitudinal axis, said bars forming two pairs of diametrically opposite fork legs, working tool means on the free ends of the legs of at least one of said pairs, and vibration generating means having fixed driving connections to the free end portions of the legs of one of said pairs, said vibration generating means being operable to apply cyclic longitudinal vibration forces on said legs at the frequency of a longitudinal resonant elastic vibration of said legs, whereby said legs of said one pair vibrate longitudinally in unison, and whereby the legs of the remaining pair are caused, by virtue of cyclic stresses transmitted thereto from said first pair of legs through said common end, to vibrate longitudinally in unison with one another but at 180° phase difference from said first mentioned pair.

12. The subject matter of claim 11, including also means for rigidly laterally interconnecting the free end portions of the two legs of each pair.

13. In combination, four parallel elastic bars rigidly joined at one common end to provide a fork structure, said bars being laterally spaced from one another and grouped about a central longitudinal axis, said bars forming two pairs of diametrically opposite fork legs, working tool means on the free ends of the legs of at least one of said pairs, vibration generators, one for each of said legs, having fixed driving connections to the free end portions of said legs and operable to apply cyclic longitudinal vibration forces thereto at the frequency of resonant vibration of the legs, and means synchronizing the generator of each pair of legs for in-phase vibration, and the generators of different pairs for vibration with 180° phase difference.

14. In a sonic earth boring drill, the combination of: an essentially vertically disposed bar means receivable in the well bore including two vertical bar sections having ends joined to one another, each of said bar sections having coacting distributed elastic stiffness and vibratory mass for giving the bars like resonant frequency for co-operative elastic longitudinal quarter-wave-length standing wave vibration thereof at said frequency, with a velocity node at the juncture of the bar sections and velocity antinodes at the free extremities thereof, a mechanical vibrator operable at said resonant frequency coupled to said bar means at a longitudinally vibratory portion thereof and arranged to apply cyclic vibration forces to said bar means longitudinally thereof to generate and sustain said standing wave vibration, one of said free extremities of said bar sections being at the lower end thereof, a drill bit attached to said last-mentioned extremity, and a supporting drill string attached to said bar means in the region of said velocity node.

15. The subject matter of claim 14, wherein said juncture of said bar sections is at the upper extremities of said bar sections and said bar sections are parallel and extend downwardly from said juncture.

16. In a sonic earth boring drill, the combination of: a massive elastic fork structure comprising a head and a plurality of parallel elastic legs depending therefrom, said legs having constants of mass and elasticity located therealong to establish a common resonant frequency for longitudinal resonant elastic vibration of said legs with respect to said head, a bit connected to the lower end portion of at least one of said legs, and a vibrator having a fixed driving connection to the lower portion of at least one of said legs operable to apply cyclic longitudinal vibration forces thereto at said resonant frequency.

17. In a sonic earth boring drill, the combination of: a massive elastic fork structure comprising a head and a pair of parallel laterally spaced elastic leg means depending therefrom, said leg means being free of one another beyond said head for 180° opposed longitudinal elastic vibration, each of said leg means having constants of mass and elasticity located therealong to establish a common frequency for longitudinal resonant elastic vibration of the leg means with respect to said head, a bit connected to the lower end of at least one of said leg means, and a vibrator having a fixed driving connection to the lower portion of at least one of said leg means operable to apply cyclic longitudinal vibration forces thereto at said resonant frequency.

18. In a sonic earth boring drill, the combination of: a massive elastic vibratory structure comprising a head and a pair of concentric elastic legs depending therefrom, said legs having constants of mass and elasticity located therealong to establish a common frequency for longitudinal resonant elastic vibration of the said legs with respect to said head, a bit connected to the lower end of at least one of said legs, and a vibrator having a fixed driving connection to the lower portion of at least one of said legs operable to apply cyclic longitudinal vibration forces thereto at said resonant frequency.

19. The subject matter of claim 18, wherein the bit and vibrator are connected to different legs.

20. The subject matter of claim 18, wherein the bit and vibrator are connected to the same leg.

21. The subject matter of claim 18, wherein the vibrator is connected to the inner of the two legs.

22. The subject matter of claim 18, wherein the vibrator is connected to the inner of the two legs and the bit is connected to the outer of the two legs.

23. In combination: a plurality of parallel elastic bars rigidly joined to one another at a common end, so as to form a unitary structure, said bars having constants of mass and elasticity located therealong to establish a common frequency for longitudinal resonant elastic vibration of said bars, a working tool connected to the free end of at least one of said bars, and vibration generating means combined with the bars for creating alternating longitudinal tensile and compressive stresses in the bars at said resonant frequency and with uniform phase difference between bars, whereby to cause the bars to alternately elastically elongate and contract, with a symmetrical polyphase relationship between bars.

24. The subject matter of claim 23, wherein the vibration generating means includes a vibrator having a fixed driving connection to a free end portion of at least one of said bars and operable to apply cyclic longitudinal vibration forces on said free end portion of said bar at said resonant frequency.

25. The subject matter of claim 23, wherein said structure comprises a fork and said bars are disposed alongside one another and comprise the legs of said fork.

26. The subject matter of claim 23, wherein the bars of said structure comprise at least one centrally disposed inside leg and at least one tubular outside leg concentric with and surrounding said centrally disposed leg.

27. The subject matter of claim 23, wherein said bars comprise at least two concentric legs, and wherein the vibration generating means comprises a vibrator coupled to the free end portion of the innermost of said legs and arranged to exert cyclic longitudinal vibration forces thereon.

28. In combination: a plurality of parallel elastic longitudinally vibratory bars rigidly joined to one another at a common end, so as to form a unitary plural-legged structure, said bars having constants of mass and elasticity located therealong to establish a common frequency for longitudinal resonant elastic vibration of said bars, a working tool connected to the free end of at least one of said bars, and vibration generating means combined with the bars for setting said bars into longitudinal elastic vibration at said resonant frequency and in symmetrical relationship to one another.

29. In a sonic earth boring drill, the combination of: a massive acoustic fork structure comprising a head and a plurality of parallel elastically longitudinally vibratory legs depending therefrom, said legs having constants of mass and elasticity located therealong to establish a common resonant frequency for longitudinal resonant elastic vibration of said legs with respect to said head, a bit connected to the lower end of at least one of said legs, and means for setting said legs into longitudinal elastic vibration at said resonant frequency and in symmetrical polyphase relationship to one another.

30. The subject matter of claim 29, wherein the net downwardly facing areas of the lower portions of the fork legs are substantially the same for all legs.

31. The subject matter of claim 29, wherein the net downwardly facing areas of the lower portions of the fork legs are substantially the same for all phases.

References Cited in the file of this patent

UNITED STATES PATENTS

| | | |
|---|---|---|
| 1,062,050 | Steward | May 20, 1913 |
| 1,966,446 | Hayes | July 17, 1934 |
| 2,554,005 | Bodine | May 22, 1951 |
| 2,612,860 | Pendleton | Oct. 7, 1952 |
| 2,649,286 | Karlstrom | Aug. 18, 1953 |
| 2,672,322 | Bodine | Mar. 16, 1954 |
| 2,803,433 | Smith | Aug. 20, 1957 |
| 2,830,791 | Smith | Apr. 15, 1958 |